(12) United States Patent
Kukreja et al.

(10) Patent No.: US 10,049,331 B2
(45) Date of Patent: Aug. 14, 2018

(54) ENTERPRISE RESOURCE PLANNING TOOL

(75) Inventors: Sanjay Kukreja, New Delhi (IN); Aditya Bajaj, New Delhi (IN); Rajan Sachdeva, Noida (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/182,709

(22) Filed: Jul. 14, 2011

(65) Prior Publication Data

US 2012/0029967 A1 Feb. 2, 2012

(30) Foreign Application Priority Data

Jul. 30, 2010 (IN) ............................ 2174/CHE/2010

(51) Int. Cl.
*G06Q 10/00* (2012.01)
*G06Q 10/06* (2012.01)
*G06Q 10/08* (2012.01)

(52) U.S. Cl.
CPC ....... *G06Q 10/06* (2013.01); *G06Q 10/06315* (2013.01); *G06Q 10/087* (2013.01)

(58) Field of Classification Search
CPC ...... G06Q 40/00; G06Q 40/04; G06Q 10/087; G06Q 10/06; G06Q 10/10; G06Q 30/02
See application file for complete search history.

(56) References Cited

U.S. PATENT DOCUMENTS

| 7,778,870 | B1 * | 8/2010 | Kriza | ................... G06Q 30/02 705/14.16 |
| 2002/0046091 | A1 * | 4/2002 | Mooers | .............. G06Q 30/0231 705/14.31 |
| 2003/0172007 | A1 * | 9/2003 | Helmolt | ............... G06Q 10/087 705/28 |

(Continued)

FOREIGN PATENT DOCUMENTS

| EP | 1 177 515 B1 * | 11/2003 | ............. G06F 17/60 |
| EP | 1177515 B1 * | 11/2003 | ............. G06Q 10/10 |
| WO | WO2001052158 A2 | 7/2001 | |

OTHER PUBLICATIONS

Chennai, IT firms zoom in on FMCG firms' secondary sales mgmt, Jun. 6, 2005, http://www.financialexpress.com/news/it-firms-zoom-in-on-fmcg-firms-secondary-sales-mgmt/140183/1.*

(Continued)

*Primary Examiner* — Vanel Frenel
(74) *Attorney, Agent, or Firm* — Fish & Richardson P.C.

(57) ABSTRACT

An enterprise resource planning tool that accesses primary sales data tracked by an enterprise resource planning system operated by a company and describing primary sales of products offered by the company. The enterprise resource planning tool also accesses inventory level data that describes inventory levels for the products at one or more recipients of the primary sales of the products offered by the company. The enterprise resource planning tool further derives secondary sales data that describes secondary sales (Continued)

of the products offered by the company based on the accessed primary sales data and the accessed inventory level data. In addition, the enterprise resource planning tool stores the derived secondary sales data and uses the stored secondary sales data to perform operations related to enterprise resource planning.

13 Claims, 20 Drawing Sheets

(56) References Cited

U.S. PATENT DOCUMENTS

| | | | | |
|---|---|---|---|---|
| 2004/0039640 A1* | 2/2004 | Koppelman | ..... | G06Q 10/06398 705/14.7 |
| 2004/0103103 A1* | 5/2004 | Kalthoff | ............ | G06F 17/30303 |
| 2004/0172341 A1* | 9/2004 | Aoyama | ................ | G06Q 10/08 705/26.1 |
| 2004/0193439 A1* | 9/2004 | Marrott | .................. | G06Q 40/12 705/30 |
| 2005/0004831 A1* | 1/2005 | Najmi | ..................... | G06Q 10/06 705/7.22 |
| 2005/0060242 A1 | 3/2005 | Armstrong et al. | | |
| 2013/0013420 A1* | 1/2013 | Bamborough | ......... | G06Q 30/02 705/14.69 |

OTHER PUBLICATIONS

Lecture Slides on Distribution Management, Shri Baba Mastnath Institute of Management Studies & Research, relevant slides 1 and 86, May 15, 2009, http://www.sbmimsar.com/DistribMgmt_LectSlides.pdf (only referenced slides are attached, entire reference can be found at website).*
Chennai, IT firms zoom in on FMCG firms' secondary sales mgmt, Jun. 6 2005, http://www.financialexpress.com/news/it-firms-zoom-in-on-fcmg-firms-secondary-sales-mgmt/140138/1.*
Havaldar et al., Sales and Distribution Management, text and cases, McGraw-Hill Co. 2007, p. 11-18 excerpt.*
Chennai, IT firms zoom in on FMCG firms' secondary sales mgmt, Jun. 6, 2005.*
Havaldar et al., Sales and Distribution Management, text and cases, McGraw-Hill Co. 2007, p. 11-18.*
Havaldar et al., Sales and Distribution Mangement, text and cases, McGrawHill Co. 2007, p. 11-18.*
Chennai, IT firm Zoom in on FMCG firms' secondary sales mgmt, Jun. 6, 2005.*
Havaldar et al., Sales and Distribution Management, text and cases, McGraw Hill Co. 2007, p. 11-18.*
Australian Patent Examination Report No. 1 for Application No. 2011204963 dated Sep. 27, 2012, 3 pages.
Shaoping, "Analysis of Business Activities of Commercial Enterprises," Apr. 30, 1989, 10 pages.
Office Action in CN Application No. 201110223691.8, dated Sep. 28, 2015, 13 pages (with English translation).
Australian Patent Examination Report No. 2 for Application No. 2011204963 dated May 20, 2013, 4 pages.
Shaoping, "Analysis of Business Activities of Commercial Enterprises," Apr. 30, 1989, 13 pages (with English Abstract).
Office Action in CN Application No. 201110223691.8, dated May 4, 2016, 6 pages (with English translation).
India Office Action for Application No. 2174/CHE/2010, dated Feb. 22, 2017 8 pages.

* cited by examiner

FIG. 4

| Code (502) | Description (504) | ACR | | | Forecast Accuracy [Primary base] | | | | | | M1 Forecast | | | |
|---|---|---|---|---|---|---|---|---|---|---|---|---|---|---|
| | | Value (506) | M1 Value [In Lac] (508) | M2 Value [In Lac] (510) | L3M (512) | Lift over L3M (514) | L12M (516) | Lift over L12M (518) | Last Year M1 Actual (520) | Lift over Last Year M1 Actual (522) | Week 1 | Week 2 | Week 3 | Week 4 |
| FC350500 | Hajmola Candy | 1153.85 | 0 | 0 | 0 | 0 | 0 | 0 | 0 | 0 | 0 | 0 | 0 | 0 |
| FC116005 | Vatika Sun Pro | 0 | 0 | 0 | 0 | 0 | 0 | 0 | 0 | 0 | 0 | 0 | 0 | 0 |
| FC116200 | Vatika Sun Pro | 0 | 0 | 0 | 0 | 0 | 0 | 0 | 0 | 0 | 0 | 0 | 0 | 0 |
| FC116100 | Vatika Sun Pro | 0 | 0 | 0 | 0 | 0 | 0 | 0 | 0 | 0 | 0 | 0 | 0 | 0 |
| FC35017J | Hajmola Candy | 1586.28 | 0 | 0 | 0 | 0 | 0 | 0 | 0 | 0 | 0 | 0 | 0 | 0 |
| FC550030 | Glucose-D 30gm Sachet | 0 | 0 | 0 | 0 | 0 | 0 | 0 | 0 | 0 | 0 | 0 | 0 | 0 |
| FC11600 | Vatika Sun Pro | 0 | 0 | 0 | 0 | 0 | 0 | 0 | 0 | 0 | 0 | 0 | 0 | 0 |
| FC010650 | Amla Hair Oil | 1442.31 | 46.15 | 47.6 | 2350 | 0.5 | 1540 | 0.8 | 1908 | 0.6 | 600 | 1000 | 800 | 800 |
| FB2003DC | Babool Toothpaste 30gms - Carton Pack | 1577.44 | 0 | 0 | 0 | 0 | 0 | 0 | 0 | 0 | 0 | 0 | 0 | 0 |

FIG. 5

| Stockist | Code | Description | BPM | RPM | Sales Sche-me in Receiv. | Sales Sche-me in Cash | Free Units | Scheme % | Rebates Received % | Per Carton | Rebate Ratio (Sec/Pri) | Claimed Amt (Rs.) | Reason for Ment. | Approve |
|---|---|---|---|---|---|---|---|---|---|---|---|---|---|---|
| 0011002487 | FC010200 | Amla Hair Oil 200ml | 33 | 31 | 47 | 39 | 21 | 1.5 | 1.49 | 45 | 1.04 | 995.76 | Valid Scheme | |
| 0011002487 | FC010300 | Amla Hair Oil 300ml | 21 | 17 | 23 | 18 | 6 | 1.5 | 1.38 | 15 | 1.53 | 390.04 | Valid Scheme | |
| 0011002487 | FC010500 | Amla Hair Oil 500ml | 35 | 28 | 60 | 46 | 11 | 1.5 | 1.49 | 46 | 1.30 | 1084.01 | Valid Scheme | |
| 0011002487 | FC080150 | Vatika Hair Oil 150ml | 9 | 7 | 6 | 4 | 7 | 4 | 3.64 | 5 | 1.2 | 240.91 | Valid Scheme | |
| 0011002487 | FC200060 | Lal Dant Manjan 60gm | 13 | 11 | 18 | 12 | 17 | 1 | 0.98 | 10 | 1.8 | 175.39 | Secondary / Primary > 1.75 | |
| 0011002487 | FC200150 | Lal Dant Manjan 150gm | 7 | 5 | 4 | 2 | 3 | 3 | 2.5 | 4 | 1 | 70.75 | Valid Scheme | |
| 0011002487 | FC250050 | Dabur Red Tooth Paste 50gm | 4 | 3 | 6 | 4 | 23 | 4 | 3.99 | 5 | 1.2 | 237.54 | Valid Scheme | |
| 0011002487 | FC250100 | Dabur Red Tooth Paste 100gm | 10 | 7 | 7 | 4 | 11 | 4 | 3.81 | 6 | 1.16 | 246.89 | Valid Scheme | |
| 0011002487 | FC300050 | Dabur Honey 50gm | 4 | 3 | 3 | 1 | 3 | 3 | 2.5 | 2 | 1.5 | 51.35 | Valid Scheme | |
| 0011002487 | FC300100 | Dabur Honey 100gm | 4 | 3 | 6 | 3 | 6 | 3 | 2.77 | 4 | 1.5 | 191.99 | Valid Scheme | |
| 0011002487 | FC300250 | Dabur Honey 250gm | 5 | 4 | 9 | 6 | 5 | 3 | 2.60 | 8 | 1.12 | 345.64 | Valid Scheme | |
| 0011002487 | FC300500 | Dabur Honey 500gm | 8 | 5 | 11 | 8 | 3 | 3 | 2.34 | 13 | 0.84 | 354.59 | Valid Scheme | |
| 0011002487 | FC300001 | Dabur Honey 1Kg | 7 | 5 | 12 | 8 | 2 | 3 | 2.77 | 11 | 1.09 | 373.78 | Valid Scheme | |
| 0011002487 | FC410120 | Hajmola Reg 12 | 17 | 13 | 19 | 11 | 3 | 2 | 1.70 | 14 | 1.35 | 275.88 | Valid Scheme | |

| User Role | Content Type | Content description | Frequency |
|---|---|---|---|
| SO | Alert | Own Top Level Value sales (a) Target (b)invoiced(C) PBNS (d) Backorder (MTD Figures) | Daily |
| ASE / CAE | Alert | Own + Subordinate sales report as mentioned in point 1 | Daily |
| Area Manager | Alert | Own + Subordinate sales report as mentioned in point 1 | Daily |
| ZSM | Alert | Own + Subordinate sales report as mentioned in point 1 | Daily |
| RH | Alert | Own + Subordinate sales report as mentioned in point 2 | Daily |
| Entire sales hierachy | Query | Availability of stock at Site x SKU level | Need based |
| SO /ASE/AM/ZSM | Trigger Based | Overdues, Cheque Bounced <14 days;Details of cheque and reasons for bouncing | Need based |
| RH/Head of Sales | Trigger Based | Overdues, Cheque Bounced >14 days;Details of cheque and reasons for bouncing | Need based |
| Sales hierarchy relevant to the market + External | Broadcast | Communication like price change, trade promotion/scheme | Need based |
| Entire Sales Hierarchy | Alert | Category wise | To be decided |
| SO /ASE/AM/ZSM | Query | Promotion Width % (% of stockists purchasing promoted SKU) | Need based |
| SO /ASE/AM/ZSM | Query/Trigger | % OOS stockists for a SKU / brand (Strategic to that area) | Need based |
| SO /ASE/AM/ZSM | Trigger | POS material reached when GR happens at CFA | Need based |
| SO /ASE/AM/ZSM | Alert | Debit/Credit processed total for the week | Weekly |
| SO /ASE/AM/ZSM | Alert | Secondary claims entered, secondary claims verified,secondary claims pending approval and secondary claims exceptions | Weekly |

FIG. 17

ENTERPRISE RESOURCE PLANNING TOOL

FIELD

The present application claims the benefit of Indian Patent Application No. 2174/CHE/2010, filed on Jul. 30, 2010, which is incorporated herein by reference in its entirety for all purposes.

BACKGROUND

Enterprise resource planning (ERP) systems are computer-based systems used to manage internal and external resources including tangible assets, financial resources, materials, and human resources. ERP systems facilitate flow of information between all business functions inside boundaries of an organization and manage the connections to outside entities. ERP systems consolidate all business operations into a uniform and enterprise wide system environment.

SUMMARY

In one aspect, a computer system includes at least one processor and at least one memory unit coupled to the at least one processor having stored thereon instructions which, when executed by the at least one processor, cause the at least one processor to perform operations. The operations include accessing primary sales data that is tracked by an enterprise resource planning system operated by a company and that describes primary sales of products offered by the company and accessing inventory level data that describes inventory levels for the products at one or more recipients of the primary sales of the products offered by the company. The operations also include deriving secondary sales data that describes secondary sales of the products offered by the company based on the accessed primary sales data and the accessed inventory level data, storing, in electronic storage, the derived secondary sales data, and using the stored secondary sales data to perform operations related to enterprise resource planning.

Implementations may include one or more of the following features. For example, the operations may include subtracting the accessed inventory level data from the accessed primary sales data and adding previous months inventory level data. The operations may include accounting for stock transfers between distributors to avoid stock transfers between distributors from being detected as secondary sales. The operations further may include accounting for goods in transit (GIT) between the company and distributors to avoid goods in transit between the company and distributors from being detected as secondary sales and determining a forecast for future sales based on GIT information.

In some implementations, the operations may include accessing, from electronic storage, the stored secondary sales data, computing supply planning metrics based on the accessed secondary sales data, and performing operations based on the computed supply planning metrics. In these implementations, the operations may include computing statistics describing forecast versus order accuracy, lost sales, forecast versus dispatch, delivered in-full, on-time orders, pack fill rate, and purchase efficiency.

In some examples, the operations may include accessing, from electronic storage, the stored secondary sales data, computing demand planning metrics based on the accessed secondary sales data, and performing operations based on the computed demand planning metrics. In these examples, the operations may include computing statistics describing forecast fidelity, forecast versus sales, and forecast accuracy. Further, in these examples, the operations may include computing demand metrics for individual distributors serviced by the company and computing a company demand metric for the company by aggregating the computed demand metrics for individual distributors serviced by the company.

In some implementations, the operations may include accessing, from electronic storage, the stored secondary sales data, computing sales metrics based on the accessed secondary sales data, and performing operations based on the computed sales metrics. In these implementations, the operations may include computing statistics describing distribution coverage, primary sales value, secondary sales value, commercial control, working capital management, and customer development.

In some examples, the operations may include accessing performance management data including the stored secondary sales data and calculating performance management metrics based on the accessed performance management data. In these examples, the operations may include accessing one or more rules that define procedures for handling incentives and generating incentives based on the calculated performance management metrics and the accessed one or more rules.

Further, the operations may include receiving user input indicating a desire to perform one or more operations related to master data management, receiving user input defining master data information, and performing master data management across an organization based on the master data information. The operations also may include defining one or more rules related to secondary promotions, accessing secondary promotion data for distributors including the stored secondary sales data, and analyzing the accessed secondary promotion data with respect to the one or more rules related to secondary promotions. The operations further may include, based on the analysis, verifying whether distributor claims for secondary promotions comply with the one or more rules related to secondary promotions and performing operations related to distributor claim settlement based on the verification.

In some examples, the operations may include accessing primary sales data tracked by a primary enterprise resource planning system that is separate from the computer system and accessing, from electronic storage, the stored secondary sales data. In these examples, the operations may include determining analytics based on the accessed primary sales data and the accessed secondary sales data and performing operations based on the determined analytics.

The operations may include defining one or more frequency rules that indicate frequency with which an alert is provided and defining one or more user rules that indicate one or more users to which the alert is provided. The operations also may include defining one or more content rules that indicate content to include in the alert, evaluating the frequency rules, the user rules, and the content rules based on data tracked by a secondary tracking system including the stored secondary sales data and providing an alert based on the evaluation and the data tracked by the secondary tracking system including the stored secondary sales data.

In addition, the operations may include accessing primary financial data related to primary sales of the products offered by the company and accessing secondary financial data related to secondary sales of the products offered by the company. The operations also may include performing financial management operations based on the accessed primary financial data and the accessed secondary financial data.

In another aspect, a computer-implemented method of using secondary sales data to perform operations related to enterprise resource planning includes accessing primary sales data that is tracked by an enterprise resource planning system operated by a company and that describes primary sales of products offered by the company and accessing inventory level data that describes inventory levels for the products at one or more recipients of the primary sales of the products offered by the company. The method also includes deriving, using a computer, secondary sales data that describes secondary sales of the products offered by the company based on the accessed primary sales data and the accessed inventory level data, storing, in electronic storage, the derived secondary sales data, and using the stored secondary sales data to perform operations related to enterprise resource planning.

In yet another aspect, at least one computer-readable storage medium is encoded with executable instructions that, when executed by at least one processor, cause the at least one processor to perform operations. The operations include accessing primary sales data that is tracked by an enterprise resource planning system operated by a company and that describes primary sales of products offered by the company and accessing inventory level data that describes inventory levels for the products at one or more recipients of the primary sales of the products offered by the company. The operations also include deriving secondary sales data that describes secondary sales of the products offered by the company based on the accessed primary sales data and the accessed inventory level data, storing, in electronic storage, the derived secondary sales data, and using the stored secondary sales data to perform operations related to enterprise resource planning.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 4, 5, 8, 11, 13, 15, and 18 are diagrams of exemplary interfaces.
FIG. 17 is a diagram of exemplary alert rules.
Like reference numbers represent corresponding parts throughout.

DETAILED DESCRIPTION

In some implementations, a tool performs management and analysis of a supply chain. In these implementations, the tool compliments an Enterprise Resource Planning (ERP) system and may be used to capture and analyze data that is not captured in the ERP system. For instance, the tool may interface with primary ERP systems and distributor systems (e.g., systems of supers distributors, distributors, retail chains, or any other recipient of primary sales) and capture data from both types of systems that would not otherwise be exchanged and analyzed together in a single place. The tool may use the captured data to track secondary sales that occur in a fragmented emerging market and may use the secondary sales to generate forecast, order capture, claim settlement, and management reporting. In order to analyze the supply chain in instances without the tool, the primary ERP systems and the distributor systems would have to generate and transmit requests for data from the other systems which may reduce the ability of the systems to handle their intended tasks. This tool may reduce the processing requirements of each system by automatically requesting data from the primary ERP systems and the distributor systems for use in analyzing the supply chain because the tool eliminates the need of the primary ERP systems and the distributor systems to generate and transmit requests for data from each of the other systems. The tool provides the additional functionality of supply chain analysis without placing the processing burden on the primary ERP systems and the distributor systems.

Figure 1:
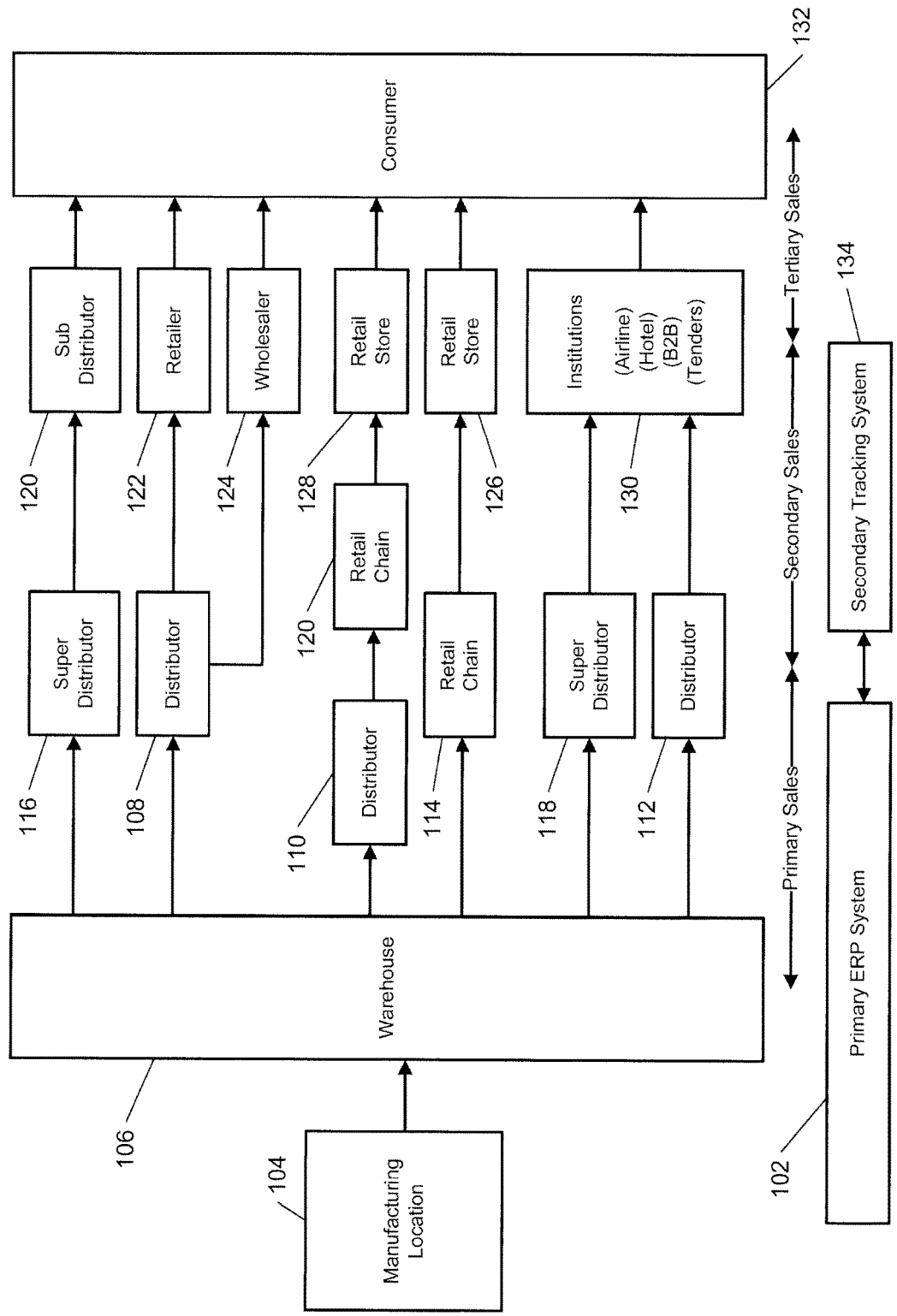
FIGS. 1, 2, and 20 are diagrams of exemplary systems.

FIG. 1 illustrates an exemplary system 100 for using derived secondary sales data to perform operations related to enterprise resource planning (ERP). The system 100 includes a primary ERP system 102 which tracks primary sales data. For example, the primary ERP system 102 may be operated by a particular company and may track primary sales of products offered by the company. Products may be manufactured, for example, at one or more manufacturing locations 104 and may be shipped, for example, to one or more warehouses 106.

The primary ERP system 102 may track primary sales of products made to various types of distributors. For example, primary sales made to distributors 108, 110, and 112 may be tracked. As another example, primary sales made to a retail chain 114 may be tracked. As yet another example, the primary ERP system 102 may also track primary sales made to super distributors 116 and 118.

The primary ERP system 102 may not be configured to track secondary sales, where secondary sales are sales of a company's products made by a recipient of primary sales of the product to another entity. For example, the super distributor 116, which is a recipient of primary sales, may sell products (e.g., secondarily) to a sub distributor 120. Other examples include the distributor 108 secondarily selling products to a retailer 122 or to a wholesaler 124 and the retail chain 114 secondarily selling products to a retail store 126. The distributor 110 may secondarily sell products to a retail chain 127, which in turn sells products to one or more retail stores 128. As another example, the super distributor 118 or the distributor 112 may secondarily sell products to one or more institutions 130 (e.g., airlines, hospitals, schools) or may secondarily sell products in some other business to business (B2B) environment. Tertiary sales to consumers 132 may be made from various entities, such as the sub distributor 120, the retailer 122, the wholesaler 124, the retail stores 126 and 128, or the institutions 130.

With the primary ERP system 102 not being configured to track secondary sales, a clear picture of current inventory of the company's products at a distributor location may be difficult or impossible to obtain. A secondary tracking system 134 may be configured to interface with the primary ERP system 102 and with distributor systems (e.g., systems of the supers distributors 116 and 118, the distributors 108, 110, and 112, and the retail chain 114, or any other recipient of primary sales).

The secondary tracking system 134 may access primary sales data tracked by the primary ERP system 102 and may access inventory level data from distributor systems. The secondary tracking system 134 may derive secondary sales data based on the accessed primary sales data received until a specific date of the month and the accessed inventory level data. Secondary sales data may be stored, and the secondary sales data may be used (e.g., by users of the secondary tracking system 134 and/or the primary ERP system 102) to perform operations related to enterprise resource planning.

For example, supply planning, demand planning, sales, performance management, or other metrics may be computed based on secondary sales data, primary sales data, forecast data, and inventory data and operations may be performed based on the computed metrics. As another example, analytics may be determined based on primary sales data, secondary sales data, forecast data, and inventory data, and operations may be performed based on the determined analytics. As yet another example, primary financial data related to primary sales and secondary financial data related to secondary sales may be accessed, and financial management operations may be performed based on the accessed primary financial data and the accessed secondary financial data. These and other examples are discussed in more detail below.

Figure 2:
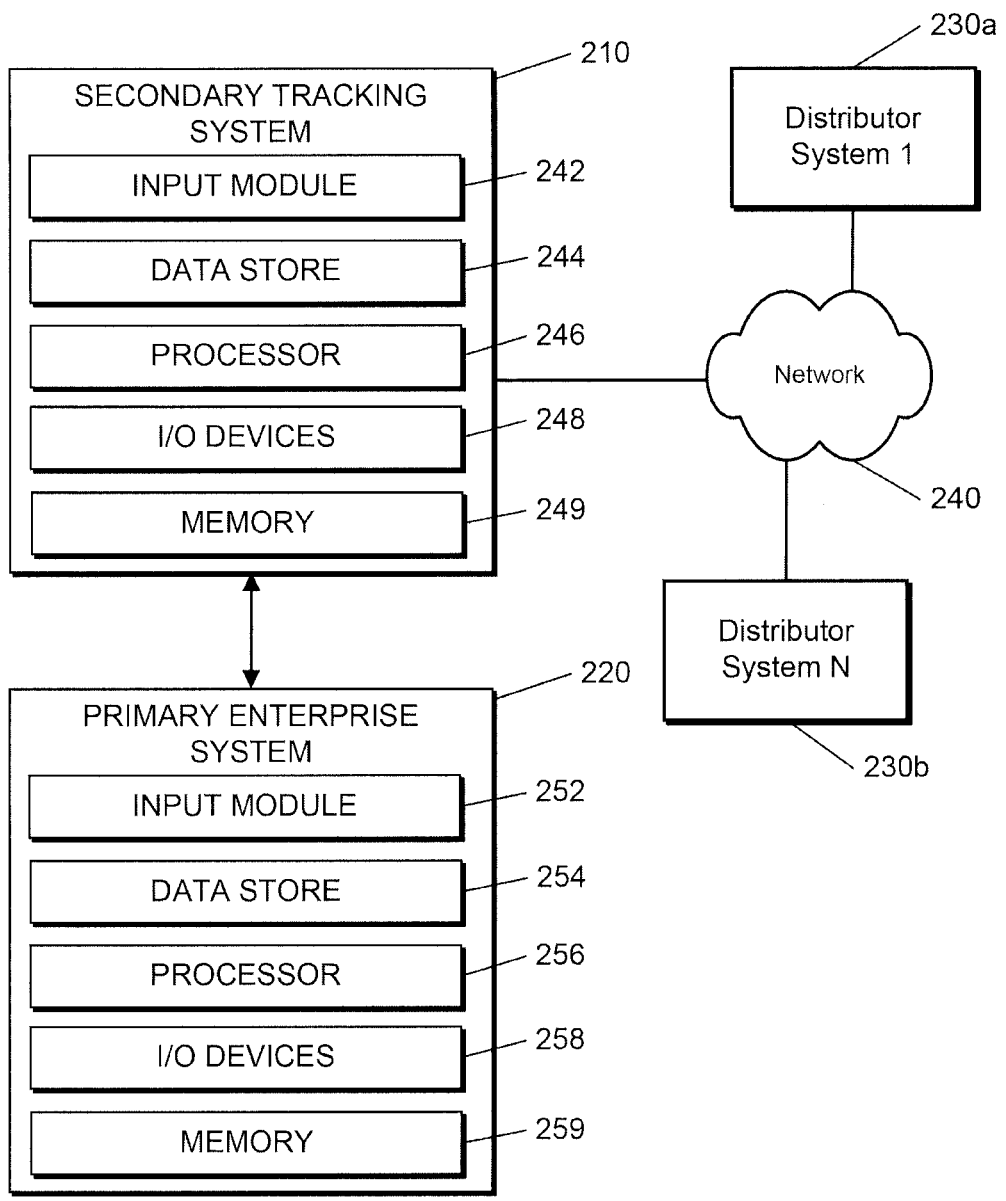

FIG. 2 illustrates an exemplary system 200 for using derived secondary sales data to perform operations related to enterprise resource planning. The system 200 includes a secondary tracking system 210, a primary enterprise system 220, and one or more distributor systems 230a-b connected by way of a network 240. The network 240 may be one or more public or private, wired or wireless networks, such as the Internet. The secondary tracking system 210 is configured to access inventory level data from the distributor systems 230a and 230b. The secondary tracking system 210 includes an input module 242, a data store 244, one or more processors 246, one or more I/O (Input/Output) devices 248, and memory 249. The primary enterprise system 220 includes an input module 252, a data store 254, a processor 256, one or more I/O devices 258, and memory 259.

The input module 242 may be used to input any type of information related to tracking secondary sales. The input module 242 may be used to enter master data information or other product information, information to define one or more alerts, information for running or defining reports, or information defining an analytic, to name a few examples. Similarly, the input module 252 may be used to input any type of information related to enterprise resource planning.

In some implementations, data from the input module 242 is stored in the data store 244. Similarly, in some implementations, data from the input module 252 is stored in the data store 254. The data included in the data store 244 may include, for example, secondary sales data. The data included in the data store 254 may include, for example, primary sales data.

In some examples, the data store 244 and/or the data store 254 may be relational databases that logically organize data into a series of database tables. Each database table in the data store 244 and the data store 254 may arrange data in a series of columns (where each column represents an attribute of the data stored in the database) and rows (where each row represents attribute values).

In some implementations, the data store 244 and/or the data store 254 may be object-oriented databases that logically or physically organize data into a series of objects. Each object may be associated with a series of attribute values.

In some examples, the data store 244 and/or the data store 254 may be a type of database management system that is not necessarily a relational or object-oriented database. For example, a series of XML (Extensible Mark-up Language) files or documents may be used, where each XML file or document includes attributes and attribute values. Data included in the data store 244 or the data store 254 may be identified by a unique identifier such that data related to a particular process may be retrieved from the data store 244 or the data store 254.

The processor 246 and the processor 256 may each be a processor suitable for the execution of a computer program such as a general or special purpose microprocessor, and any one or more processors of any kind of digital computer. In some implementations, the secondary tracking system 210 includes more than one processor 246. Similarly, in some implementations, the primary enterprise system 220 includes more than one processor 256. The processor 246 may receive instructions and data from the memory 249. Similarly, the processor 256 may receive instructions and data from the memory 259. The memory 249 may store instructions and data corresponding to any or all of the components of the secondary tracking system 210. Similarly, the memory 259 may store instructions and data corresponding to any or all of the components of the primary enterprise system 220. Each of the memory 249 and the memory 259 may include read-only memory, random-access memory, or both.

The I/O devices 248 are configured to provide input to and output from the secondary tracking system 210. Similarly, the I/O devices 258 are configured to provide input to and output from the primary enterprise system 220. For example, each of the I/O devices 248 and I/O devices 258 may include a mouse, a keyboard, a stylus, or any other device that allows the input of data. Each of the I/O devices 248 and I/O devices 258 may also include a display, a printer, or any other device that outputs data.

Figure 3:
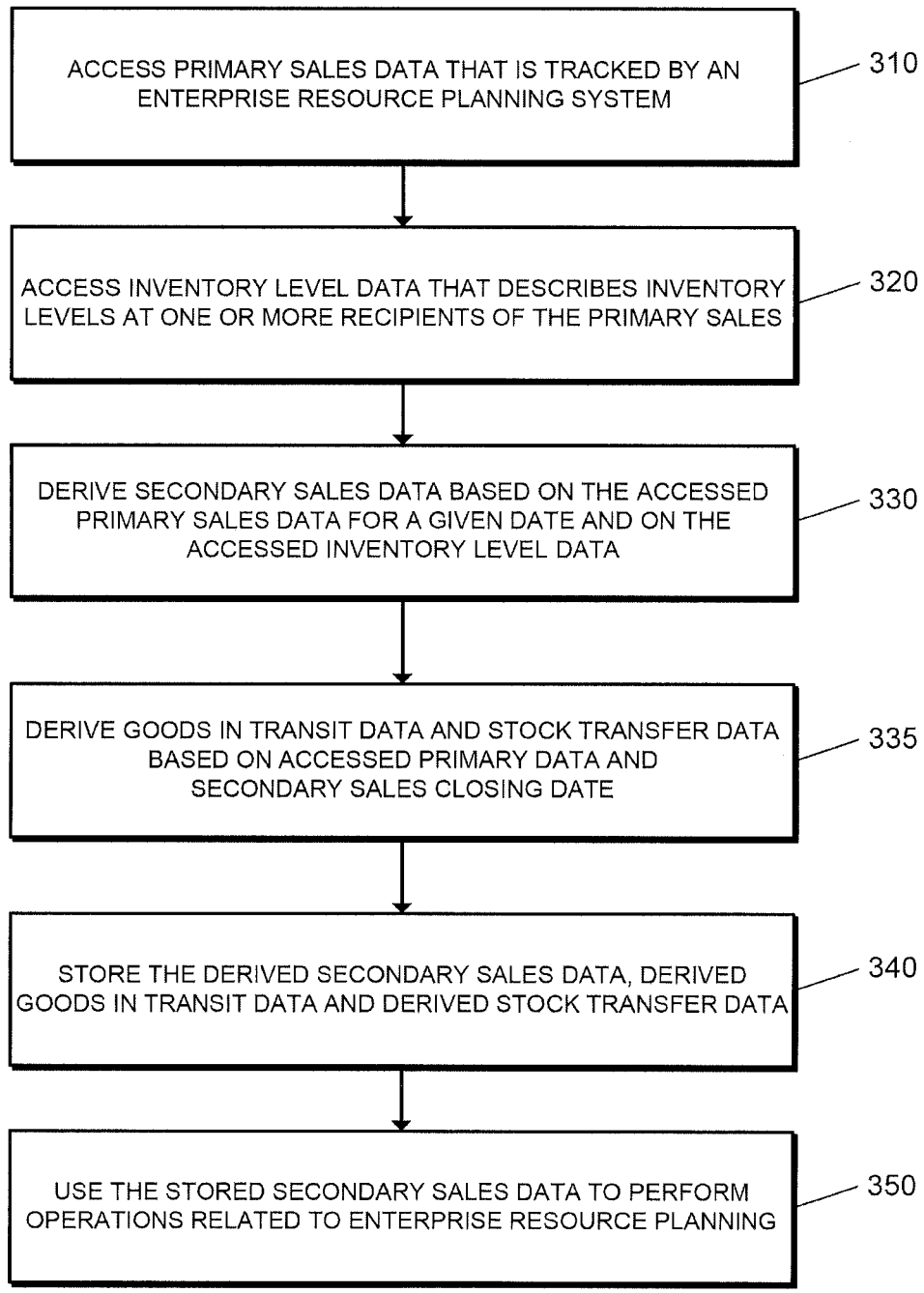
FIGS. 3, 6, 9, 10, 12, 14, 16 and 19 are flowcharts of exemplary processes.

FIG. 3 illustrates a process 300 for using derived secondary sales data to perform operations related to enterprise resource planning. The operations of the process 300 are described generally as being performed by the system 200. The operations of the process 300 may be performed by one of the components of the system 200 (e.g., the secondary tracking system 210) or may be performed by a combination of the components of the system 200. In some implementations, operations of the process 300 may be performed by one or more processors included in one or more electronic devices.

The system 200 accesses primary sales data that is tracked by an enterprise resource planning system (310). For example, the enterprise resource planning system may be operated by a company and the primary sales data may describe primary sales of products offered by the company. In this example, the primary sales tracked may be the direct sales made by the company to multiple, different distributors or distribution entities.

The system 200 accesses inventory level data that describes inventory levels at one or more recipients of the primary sales (320). For example, a secondary tracking system may interface with one or more distributor systems and may receive inventory level data from the one or more distributor systems. The system 200 may receive inventory level based on user input received from a user that assesses inventory levels at the distributor. The user may be an employee of a company that operates a secondary tracking system (or the company that operates a primary ERP system) that audits inventory levels at the distributor. In some cases, the user may be an employee of the distributor that determines inventory levels at the distributor.

In some examples, the system 200 receives inventory level data from one or more distributor systems over a network. In these examples, the one or more distributor systems may interface with a secondary tracking system and send tracked inventory level data directly to the secondary tracking system without the need for user input identifying the inventory level data.

The system 200 derives secondary sales data based on the accessed primary sales data for a given date and on the accessed inventory level data (330). For example, to derive secondary sales data, a secondary tracking system may, for each recipient of primary sales, subtract accessed inventory level data for the recipient from accessed primary sales data for the recipient and add previous month inventory data for the recipient. In this example, the result of the calculation reflects the number of secondary sales made by the recipient from the inventory included in the primary sales data. The system 200 may derive secondary sales data for each recipient of primary sales (e.g., for each distributor) and then may aggregate the derived secondary sales data for each recipient of primary sales to determine total secondary sales for the company.

The system 200 derives goods in transit data and stock transfer data based on the accessed primary data and on a secondary sales closing date (335). For example, the system 200 may account for stock transfers between distributors to avoid stock transfers between distributors from being detected as secondary sales. For instance, at times, distributors transfer inventory amongst themselves for various reasons. Because of the transfers, inventory levels at a particular distributor decline, even though the particular distributor did not make secondary sales of the declined inventory. To identify stock transfers and account for the stock transfers in deriving secondary sales data, a company employee may input transfer information for some or all products.

In some implementations, the system 200 may account for goods in transit between the company and distributors to avoid goods in transit between the company and distributors from being detected as secondary sales. In these implementations, the primary ERP system may detect primary sales to a distributor as soon as the goods associated with the primary sales have been shipped by the company. If the inventory level data is captured at the distributor after the goods have been shipped, but prior to the goods arriving at the distributor, the goods in transit would not be included in the inventory level data and, therefore, may be inappropriately detected as secondary sales.

The system 200 stores the derived secondary sales data, derived goods in transit data, and derived stock transfer data (340). For example, secondary sales data, goods in transit data, and stock transfer data may be stored in a database. The database may be a database managed by the enterprise resource planning system, or may be a database that is separate from and not managed by the enterprise resource planning system.

The system 200 uses the stored secondary sales data to perform operations related to enterprise resource planning (350). For example, enterprise resource planning operations may be performed based on computed supply planning, demand planning, or sales metrics. As another example, analytics may be determined based on primary sales data and secondary sales data, and operations may be performed based on the determined analytics. As yet another example, primary financial data related to primary sales and secondary financial data related to secondary sales may be accessed, and financial management operations may be performed based on the accessed primary financial data and the accessed secondary financial data. These and other examples are discussed in more detail below.

Figure 4:
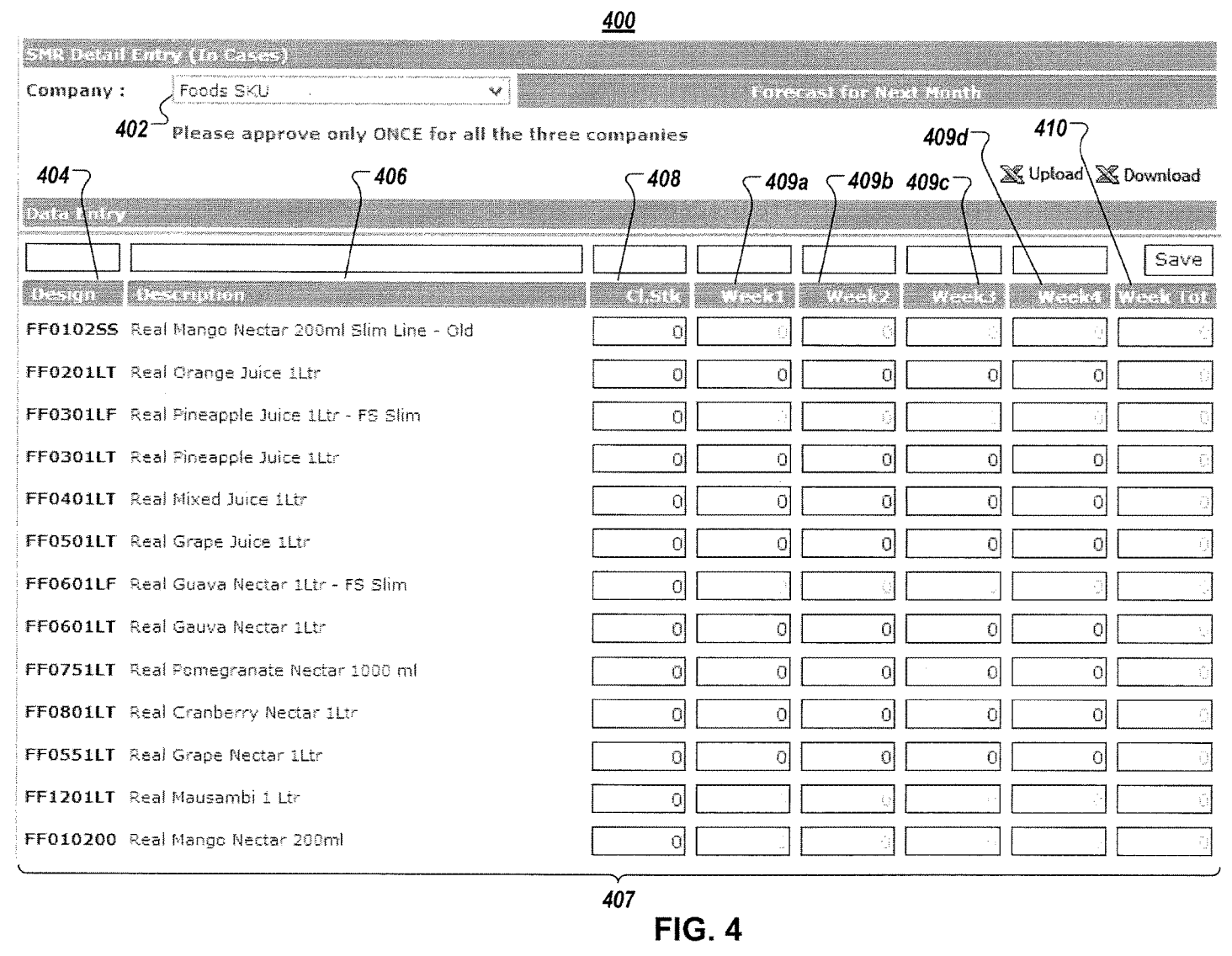

FIG. 4 illustrates an exemplary user interface 400 for capturing inventory and forecasted demand for a particular distributor. The user interface 400 enables a user to select a distributor using a control 402. For the selected distributor, product identifiers 404 and product descriptions 406 of products related to the distributor (e.g., products distributed by the distributor) are displayed in an information area 407. The information area 407 also includes, for each product 404, closing stock (e.g., inventory) information 408, weekly secondary sales forecasts 409a-d for the next four upcoming weeks, and a weekly total secondary sales forecast 410, which is a total of the forecasts displayed in the corresponding weekly secondary sales forecasts 409a-409d.

For some products 404, forecasts may not be determined. For those products 404, the corresponding weekly secondary sales forecasts 409 and weekly total secondary sales forecasts 410 may be blank or may have a different appearance (e.g., grayed out). The closing stock levels 408 may be accessed, for example, from a distributor system, such as automatically, without human intervention, or through a manual upload. The closing stock levels 408 may indicate inventory levels of unsold products for the distributor.

FIG. 5 illustrates an exemplary user interface 500 for capturing aggregated weekly forecast data. The user interface 500 displays product information and includes, for each product, a product code 502, a product description 504, a value of case rates 506, month one forecast 508 (e.g., a forecast for the upcoming month as a sum of forecast data for the upcoming four weeks), month two forecast 510 (e.g., the month after the upcoming month), average sales for the previous three months 512, a lift over sales for the previous three months average 514, average sales for the previous twelve months 516, a lift over average sales for the previous twelve months 518, monthly sales for the corresponding month in the previous year 520, a lift over sales for the corresponding month in the previous year 522, and weekly primary sales forecasts for the next four upcoming weeks 524.

The lift over sales for the previous three months average 514 and the lift over sales for the previous twelve months average 518 indicate a comparison of average actual forecasted sales versus average forecasted sales for the previous three months and the previous twelve months, respectively. The lift over sales for the corresponding month in the previous year 522 indicates a comparison of the sales from the previous month versus sales in the corresponding month of the previous year.

Figure 6:
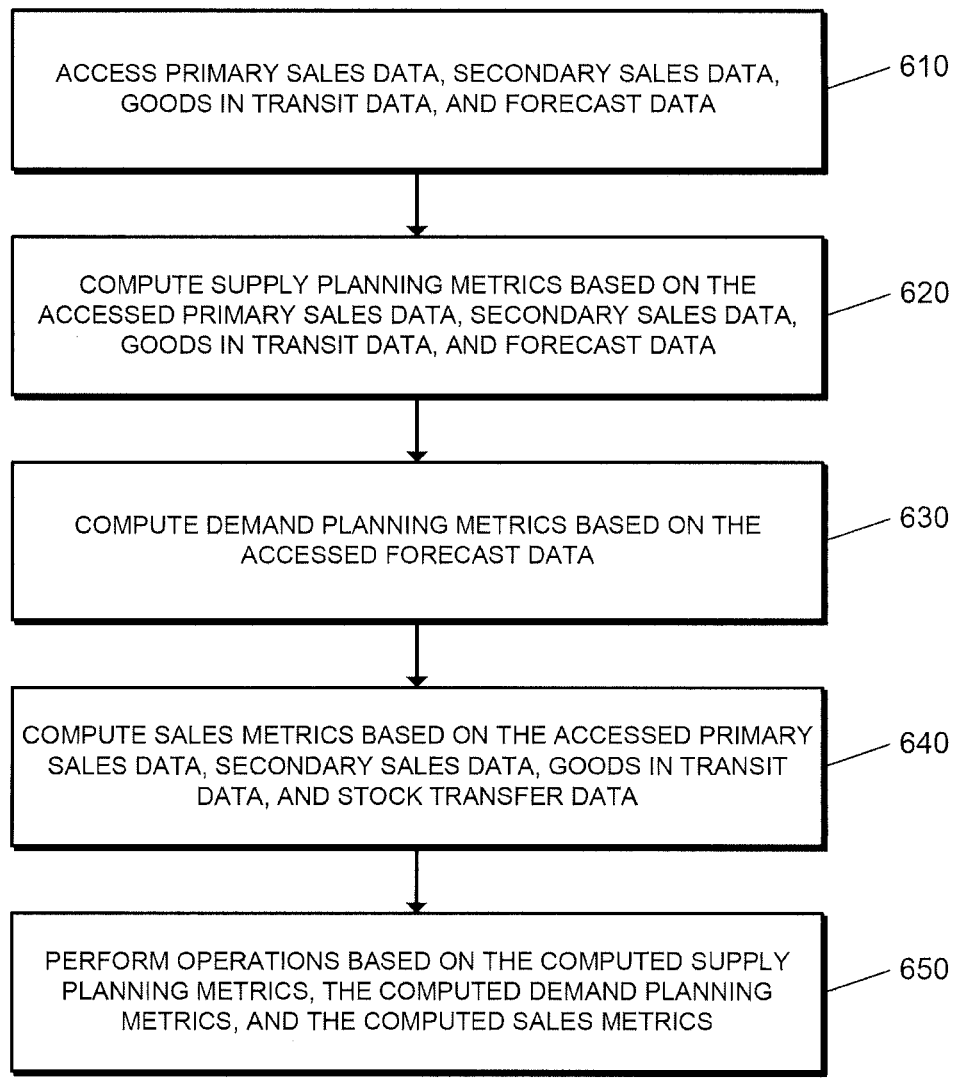

FIG. 6 illustrates a process 600 for performing enterprise resource planning operations based on computed supply planning, demand planning, and sales metrics. The operations of the process 600 are described generally as being performed by the system 200. The operations of the process 600 may be performed by one of the components of the system 200 (e.g., the secondary tracking system 210) or may be performed by a combination of the components of the system 200. In some implementations, operations of the process 600 may be performed by one or more processors included in one or more electronic devices.

The system 200 accesses primary sales data, secondary sales data, goods in transit data, and forecast data (610). For example, primary sales data, secondary sales data, goods in transit data, and forecast data may be accessed from a database, where the database may or may not be associated with an enterprise resource planning system. The forecast data may be, for example, forecast data for the upcoming month.

Figure 7:
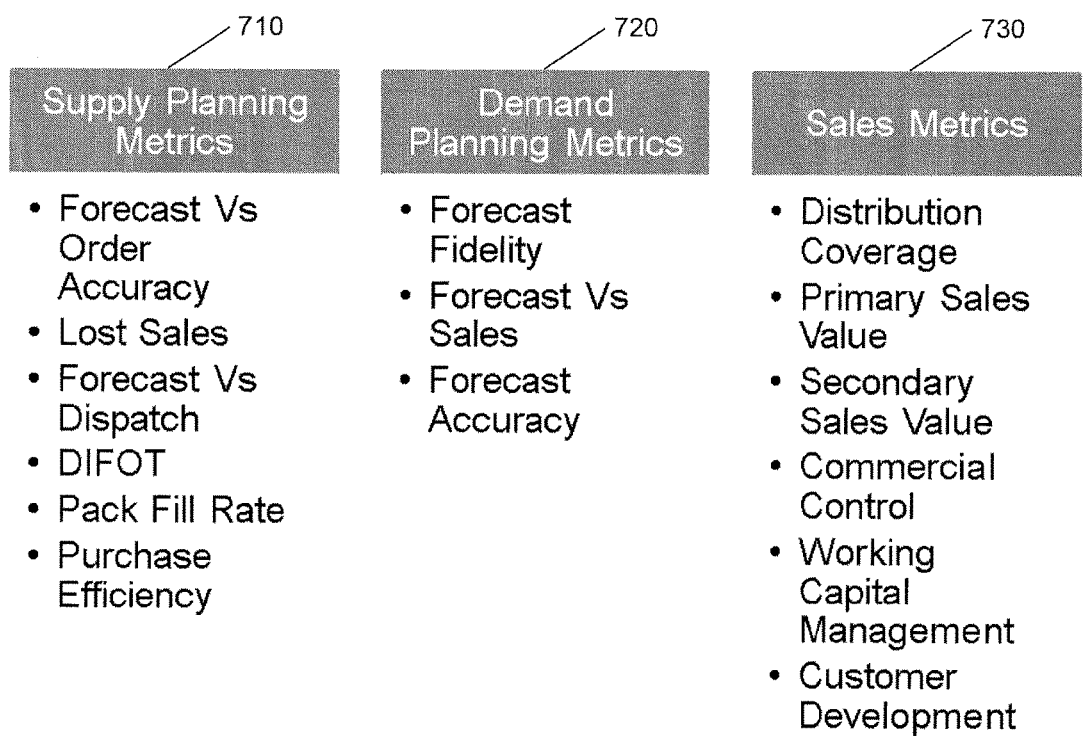
FIG. 7 is a diagram of exemplary metrics.

The system 200 computes supply planning metrics based on the accessed primary sales data, secondary sales data, goods in transit data, and forecast data (620). For example and as illustrated in FIG. 7, example supply planning metrics 710 may include a forecast versus order accuracy metric, a lost sales metric, a forecast versus dispatch metric, a delivered-in-full-on-time (DIFOT) metric, a pack fill rate metric, a purchase efficiency metric, or other supply planning metrics. The supply planning metrics 710 may account for the secondary sales data and, therefore, may provide more information than a primary ERP system can provide because the supply planning metrics 710 reflect how secondary sales are being made.

The system 200 computes demand planning metrics based on the accessed forecast data (630). For example and as illustrated in FIG. 7, example demand planning metrics 720 may include a forecast fidelity metric, a forecast versus sales metric, a forecast accuracy metric, or other demand planning metrics. The demand planning metrics 720 may account for the secondary sales data and, therefore, may provide more information than a primary ERP system can provide because the demand planning metrics 720 reflect how secondary sales are being made.

The system 200 computes sales metrics based on the accessed primary sales data, secondary sales data, goods in transit data, and stock transfer data (640). For example and as illustrated in FIG. 7, example sales metrics 730 may include a distribution coverage metric, a primary sales value metric, a secondary sales value metric, a commercial control metric, a working capital metric management metric, a customer development metric, or other sales metrics. The sales metrics 730 may account for the secondary sales data and, therefore, may provide more information than a primary ERP system can provide because the sales metrics 730 reflect how secondary sales are being made.

The system 200 performs operations based on the computed supply planning metrics, the computed demand planning metrics, and the computed sales metrics (650). For example, resource deployment may be planned based on one or more computed metrics, such as to increase, decrease, or maintain production and distribution of products. As another example, the computed metrics may be used to measure the performance of the company's supply chain and distribution network. The system 200 also may store and generate displays or reports based on the computed supply planning metrics, the computed demand planning metrics, and the computed sales metrics.

Figure 8:

Metrics may be viewed, for example, in one or more reports and/or on one or more user interfaces. For example and as shown in FIG. 8, a user interface 800 may be used to display information corresponding to a lost sales metric. For example, a graph 802 may be displayed which shows a percentage of requested units of a requested product which were serviced on a particular date. As another example, a graph 804 may be displayed on a user interface 810 which illustrates a forecast versus confirmed sales order metric.

Figure 9:
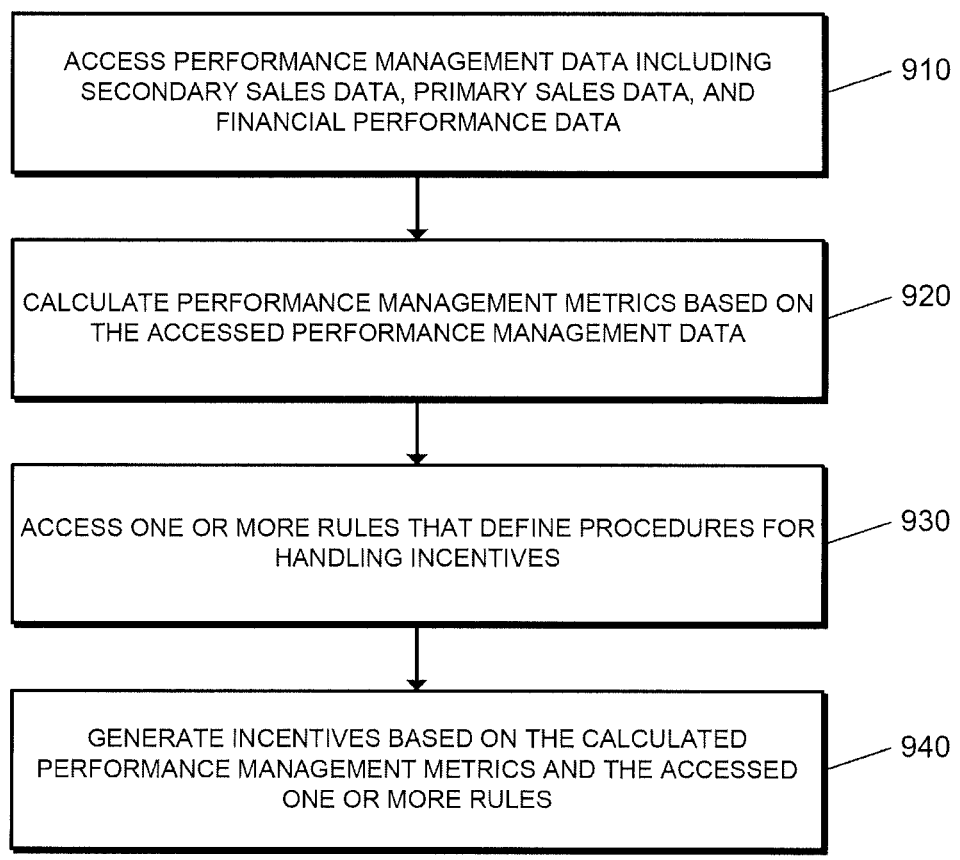

FIG. 9 illustrates a process 900 for generating incentives based on calculated performance management metrics. The operations of the process 900 are described generally as being performed by the system 200. The operations of the process 900 may be performed by one of the components of the system 200 (e.g., the secondary tracking system 210) or may be performed by a combination of the components of the system 200. In some implementations, operations of the process 900 may be performed by one or more processors included in one or more electronic devices.

The system 200 accesses performance management data including secondary sales data, primary sales data, and financial performance data (910). For example, performance management data, secondary sales data, primary sales data, and financial performance data may be accessed from a database, where the database may or may not be associated with an enterprise resource planning system. The performance management data may include any data defining secondary sales, such as data defining which distributor company made the secondary sales, which salesperson made the secondary sales, how many secondary sales were made, the timing of when the secondary sales were made, the pricing of secondary sales, how many primary sales were made in advance of the secondary sales, etc.

The system 200 calculates performance management metrics based on the accessed performance management data (920). For example, the performance management metrics may include sales totals by distributor or by salesperson. The performance management metrics also may include a percentage of inventory sold, rates of sale during particular time periods, profit made in secondary sales, and sales made in particular geographic regions.

The system 200 accesses one or more rules that define procedures for handling incentives (930). For example, a rule may define a sales total threshold for a sales period, where a distributor or a salesperson receives an incentive if associated total sales during the sales period are at or above the sales total threshold. A rule also may define a sales rate or sales profit threshold where a distributor or a salesperson receives an incentive. The one or more rules may limit the metrics used to those relating to sales made within a particular geographic region, those relating to sales made during a particular time period, and those related to secondary sales made from a specific group of primary sales.

The system 200 generates incentives based on the calculated performance management metrics and the accessed one or more rules (940). For example, a payment to a distributor or to a salesperson may be generated. In this example, the system 200 may determine that the distributor or the salesperson has met one or more performance thresholds and, therefore, should be entitled to an incentive. After such a determination, the system 200 may automatically, without human intervention, cause an incentive to be provided to the distributor or the salesperson. In another example, the system 200 may designate the distributor or the salesperson as a candidate that should receive an incentive and request approval of the incentive by a manager prior to providing the incentive to the distributor or the salesperson.

Figure 10:
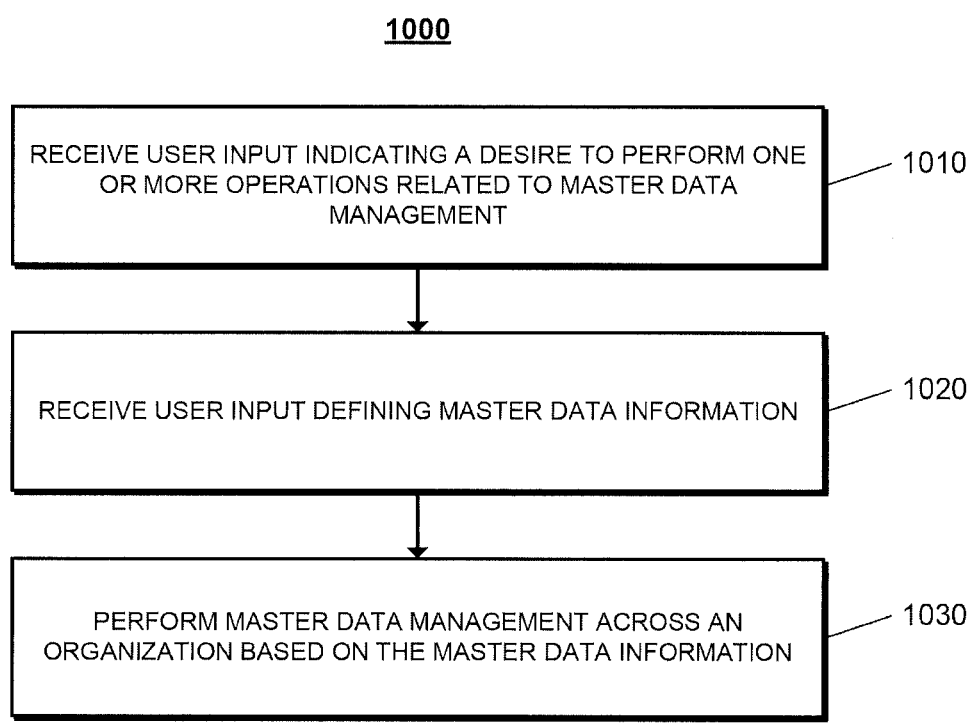

FIG. 10 illustrates a process 1000 for performing master data management. The operations of the process 1000 are described generally as being performed by the system 200. The operations of the process 1000 may be performed by one of the components of the system 200 (e.g., the secondary tracking system 210) or may be performed by a combination of the components of the system 200. In some implementations, operations of the process 1000 may be performed by one or more processors included in one or more electronic devices.

The system 200 receives user input indicating a desire to perform one or more operations related to master data management (1010). For example, a user input indicating modification, deletion, or addition of master data for a product may be received.

Figure 11:
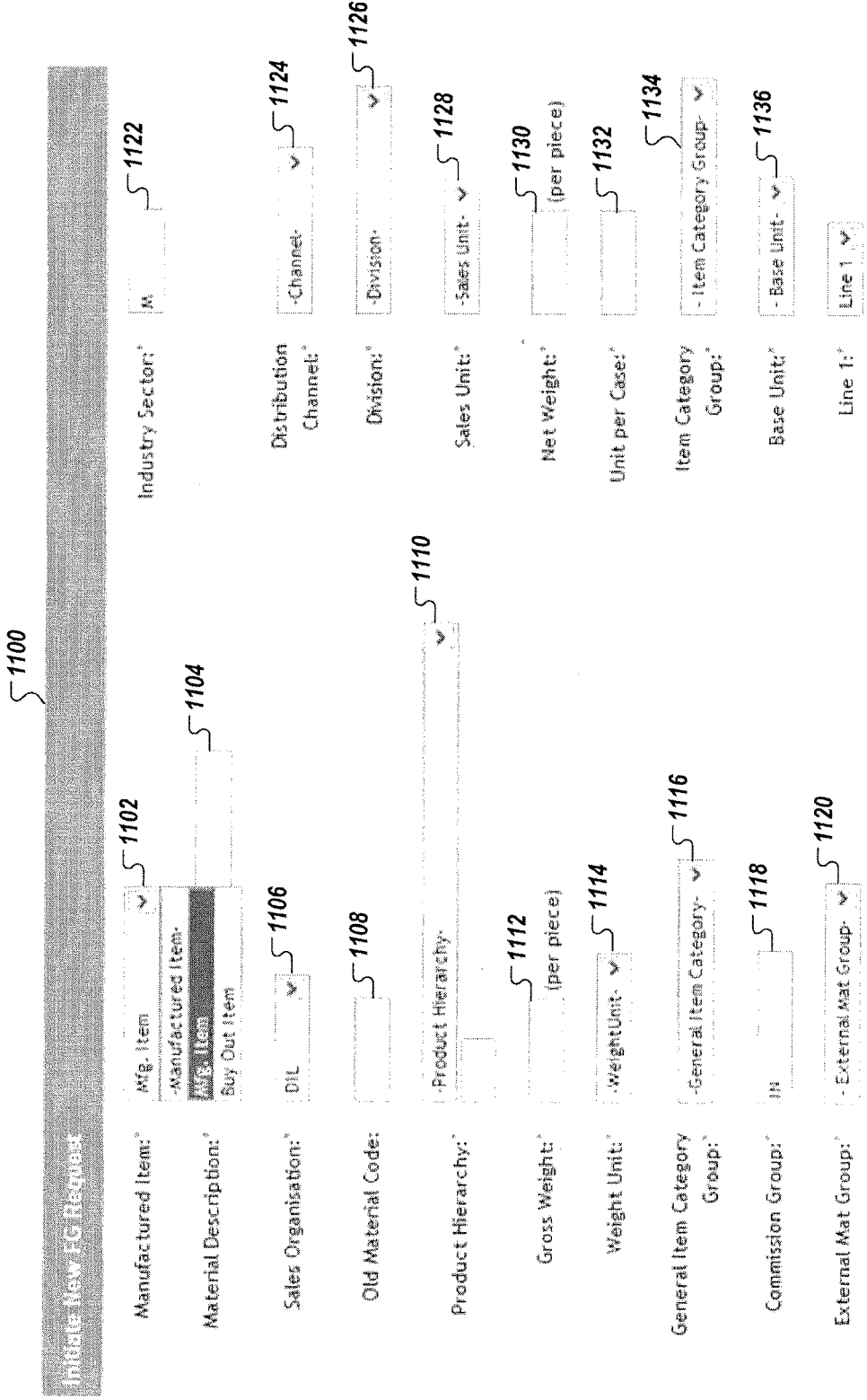

The system 200 receives user input defining master data information (1020). Master data information may include, for example, codes related to finished goods, raw materials, packaging materials and specifications, intermediate items, engineering items, and bill of material information. For example and as shown in FIG. 11, a user interface 1100 includes controls 1102-1136, which may be used to define master data information. For example, an item type (e.g., manufactured item, buy-out item) may be defined using the control 1102. As other examples, a material description, sales organization, material code, product hierarchy, gross weight per piece, weight unit, general item category group, commission group, external material group, industry sector, distribution channel, division, sales unit, net weight, unit count per case, item category group, and base unit may be defined using the controls 1104-1136, respectively.

The system 200 performs master data management across an organization based on the master data information (1030). For example, master data may be coordinated across a primary enterprise resource management system, a secondary tracking system, and one or more distributor systems. In this example, the master data defined using the interface 1100 may be sent to and used by a primary ERP system, a secondary tracking system, and one or more distributor systems. In this regard, the master data maintained at each of the primary ERP system, the secondary tracking system, and the one or more distributor systems may be the same. Therefore, processing and calculations made using data for the primary ERP system, the secondary tracking system, and the one or more distributor systems may be facilitated because all of the data includes the same attributes.

In some implementations, the system 200 may distribute master data definition and changes made to master data to all of the systems across a sales chain for an organization. In these implementations, when the master data changes or definitions are made at a secondary tracking system, the secondary tracking system may transmit data describing the master data changes or definitions to a primary ERP system and distributor systems. In response to receiving the master data changes or definitions, the primary ERP system and/or the distributor systems may conform their own master data to match that used at the secondary tracking system or my map the master data used by the secondary tracking system to their own master data to facilitate later communication between the systems.

Figure 12:
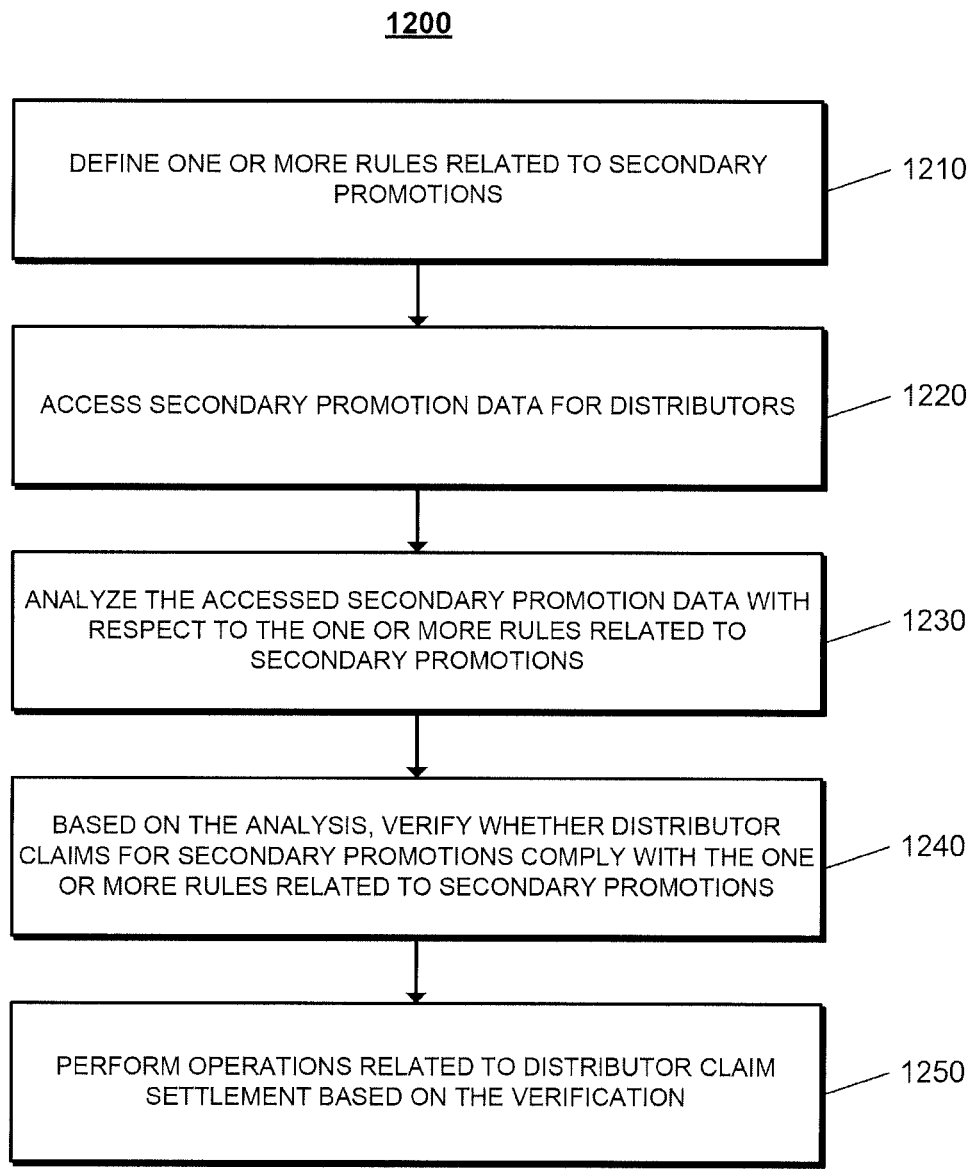

FIG. 12 illustrates a process 1200 for verifying distributor claims for secondary promotions. The operations of the process 1200 are described generally as being performed by the system 200. The operations of the process 1200 may be performed by one of the components of the system 200 (e.g., the secondary tracking system 210) or may be performed by a combination of the components of the system 200. In some implementations, operations of the process 1200 may be performed by one or more processors included in one or more electronic devices.

The system 200 defines one or more rules related to secondary promotions (1210). For example, a rule for a secondary promotion may be defined such that for a distributor's total secondary sales, the distributor may receive an incentive calculated as a fixed percentage (e.g., two percent) of total secondary sales. As another example, a rule for a secondary promotion may involve providing one or more incentives to a distributor for selling products in particular geographic areas or for selling particular products, or for selling products to particular customers. The secondary tracking system may include exception processing. For example, if the ratio of secondary sales for a product for the distributor to primary sales for the product for the distributor exceeds a threshold, the excess may be an indication that the distributor sold an unacceptable amount of "old stock" of the product, which, according to a rule definition, may disqualify the distributor from receiving the incentive, since the intent of the promotion may have been to encourage selling of new stock.

The system 200 accesses secondary promotion data for distributors (1220). For example, primary sales data and secondary sales data may be accessed for each distributor. As shown in a user interface 1300 of FIG. 13, a respective unit count 1302 of secondary sales occurring for a distributor in a particular time period for each respective product 1304, along with a corresponding, respective unit count 1306 of primary sales for the distributor for each product may be accessed.

The system 200 analyzes the accessed secondary promotion data with respect to the one or more rules related to secondary promotions (1230). For example and as shown in FIG. 13, a respective ratio 1308 of units of secondary sales to units of primary sales may be calculated for each respective product 1304.

Based on the analysis, the system 200 verifies whether distributor claims for secondary promotions comply with the one or more rules related to secondary promotions (1240). For instance, in the example of FIG. 13, the respective ratio 1308 for each respective product 1304 may be compared to a threshold (e.g., 1.75) defined by a secondary promotion rule. If the respective ratio 1308 is less than or equal to the threshold, a respective claimed amount 1310 may be marked as valid (e.g., as shown in a reason column 1312). If the respective ratio 1308 is greater than the threshold, the respective claimed amount 1310 may be marked, such as in the reason column 1312, as invalid. For example, for a product 1304a, a ratio 1308a exceeds a threshold of 1.75, as documented by a reason 1312a.

The system 200 performs operations related to distributor claim settlement based on the verification (1250). For instance, in the example of FIG. 13, a claim may be processed for each respective product 1304 for which a respective reason 1312 indicates that a respective claimed amount 1310 is valid. For example, a processed claim may be based on a respective claimed percentage 1314 (e.g., the incentive may be the respective claimed amount 1310 multiplied by the respective claims percentage 1314). In some implementations, claims processing may proceed automatically, without human intervention. In some implementations, a user may manually approve claims before claim settlements are processed, such as by selecting a respective approve control 1316 for each respective product 1304 for which claims are to be approved.

Figure 14:
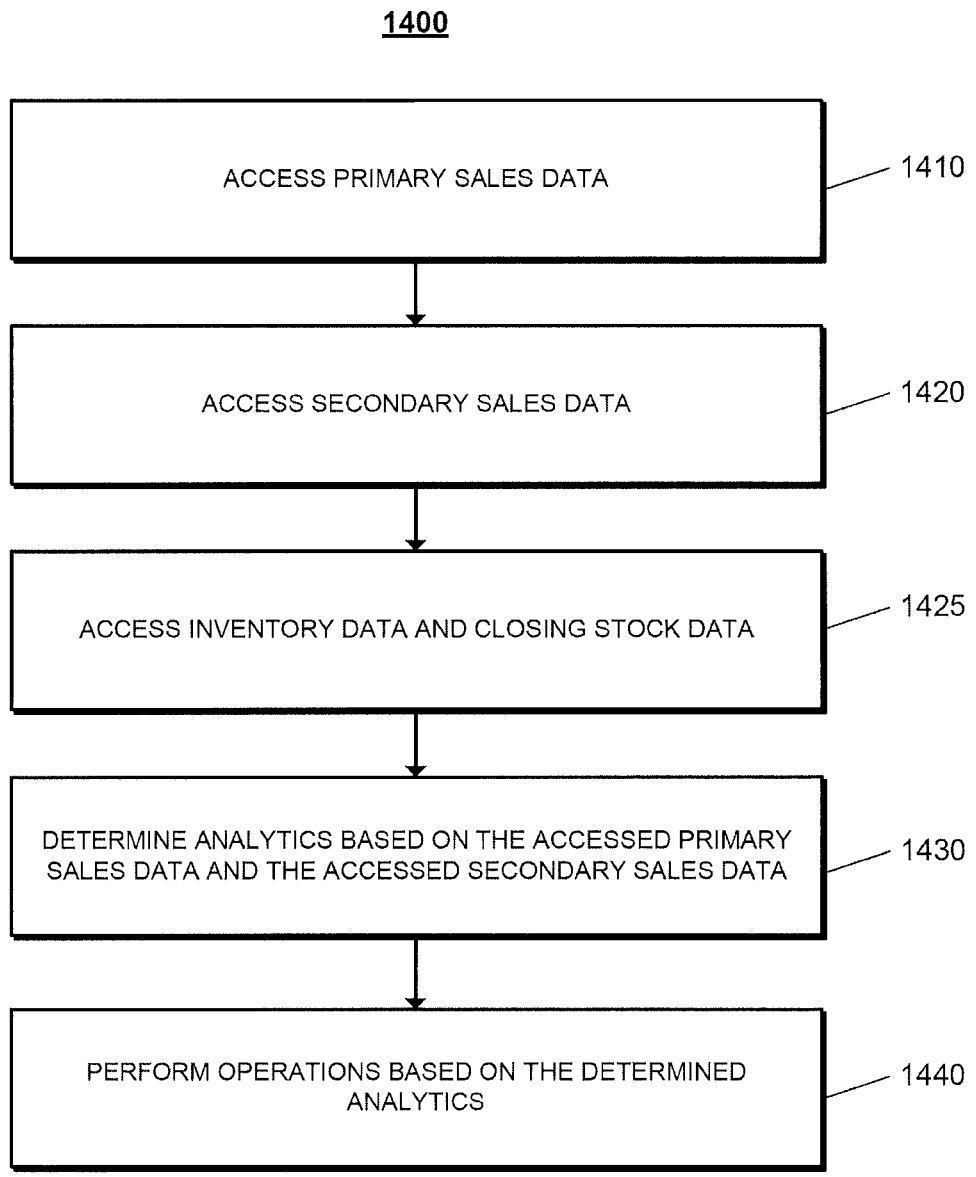

FIG. 14 illustrates a process 1400 for performing enterprise resource planning operations based on determined analytics. The operations of the process 1400 are described generally as being performed by the system 200. The operations of the process 1400 may be performed by one of the components of the system 200 (e.g., the secondary tracking system 210) or may be performed by a combination of the components of the system 200. In some implementations, operations of the process 1400 may be performed by one or more processors included in one or more electronic devices.

The system 200 accesses primary sales data (1410). For example, primary sales data may be accessed from a database, where the database may or may not be associated with an enterprise resource planning system. The primary sales data may be received over a network by a secondary tracking system from a primary ERP system that tracked the primary sales.

The system 200 accesses secondary sales data (1420). For example, secondary sales data may be accessed from a database, where the database may be associated with an enterprise resource planning system, a secondary tracking system, or may be another type of database. The secondary sales data may be accessed from electronic storage of a secondary tracking system that derived the secondary sales data using primary sales data and inventory levels at distributors.

The system 200 accesses inventory data and closing stock data (1425). For example, inventory data and closing stock data may be accessed from a database, where the database may be associated with an enterprise resource planning system, a secondary tracking system, or may be another type of database.

The system 200 determines analytics based on the accessed primary sales data and the accessed secondary sales data (1430). Various types of analytics may be determined, such as analytics related to sales, marketing, customers (e.g., customer segmentation, customer profiling), products, brand, and sales force. Custom analytics may be defined and subsequently determined based on the accessed primary sales data and the accessed secondary sales data.

Figure 15:
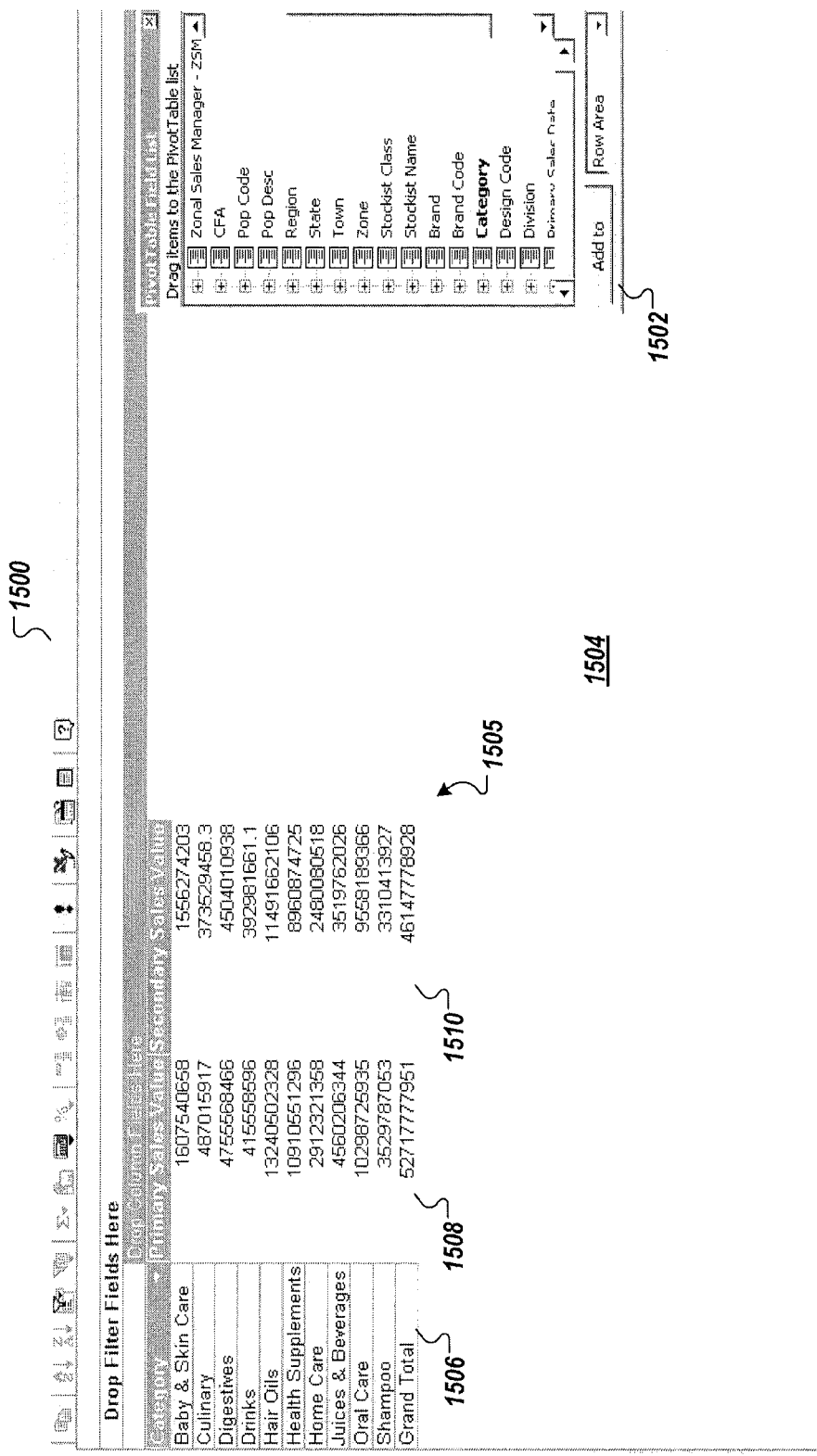

For example and as shown in FIG. 15, a user interface 1500 may be used to define a custom analytic. For example, one or more fields may be dragged from an available fields list 1502 and may be dropped onto a definition area 1504. For example, the definition area 1504 includes an analytic 1505 which includes a category field 1506, a primary sales total field 1508, and a secondary sales total field 1510. A report may be run which includes the analytic 1505, to show a report of primary sales and secondary sales, by category. Using the user interface 1500, various types of analytics may be defined, by creating various combinations of fields, where the fields may relate to primary sales data, secondary sales data, and/or other data.

The system 200 performs operations based on the determined analytics (1440). For example, reports may be run, and resource deployment may be planned or other planning activities may be performed based on conclusions made after reviewing analytics reports. The system 200 also may store and generate displays or reports based on the determined analytics.

Figure 16:
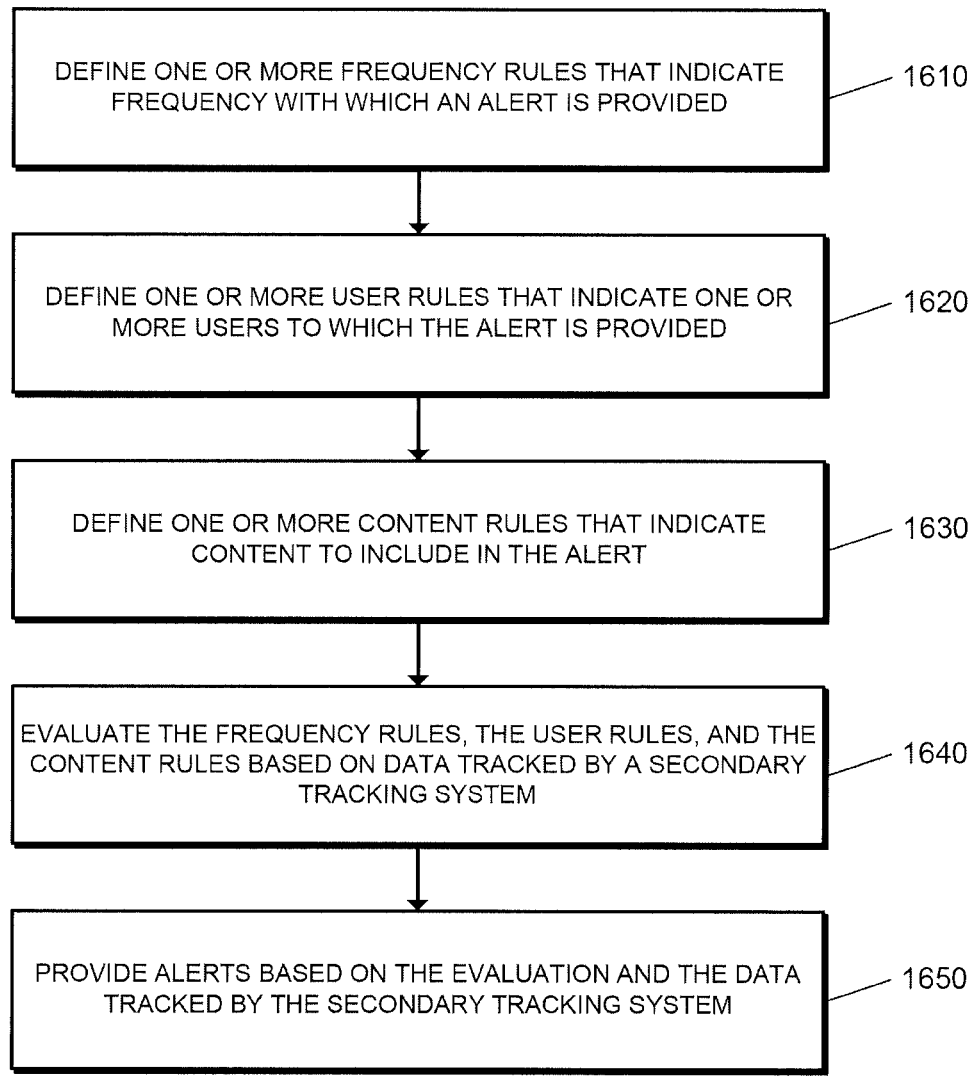

FIG. 16 illustrates a process 1600 for providing alerts. The operations of the process 1600 are described generally as being performed by the system 200. The operations of the process 1600 may be performed by one of the components of the system 200 (e.g., the secondary tracking system 210) or may be performed by a combination of the components of the system 200. In some implementations, operations of the process 1600 may be performed by one or more processors included in one or more electronic devices.

The system 200 defines one or more frequency rules that indicate frequency with which an alert is provided (1610). For example, FIG. 17 illustrates a table 1700 which includes a frequency column 1702, which references daily, weekly, and need-based frequency rules. Other frequency rules are possible, such as bimonthly, monthly, semi-monthly, quarterly, and annually.

The system 200 defines one or more user rules that indicate one or more users to which the alert is provided (1620). For instance, in the example of FIG. 17, user roles are referenced in a user role column 1704 of the table 1700. For example, the user role column 1704 references area manager, everyone in a sales hierarchy, head of sales, and other user roles.

The system 200 defines one or more content rules that indicate content to include in the alert (1630). For instance, in the example of FIG. 17, content rules are referenced in a content type column 1706 and a content description column 1708 of the table 1700. For example, content types may be alert, query, trigger-based or broadcast. Content may be, for example, primary and/or secondary sales data associated with a user role and with associates of the user defined by the user role. The content may include availability of stock at a particular site, overdue payments, check bouncing, debits, credits, or other financial information or alerts, product price changes, promotion status, reaching of sales levels, secondary claims entered, verified, pending approval, or exceptions, or other types of content.

The system 200 evaluates the frequency rules, the user rules, and the content rules based on data tracked by a secondary tracking system (1640). For example, for a trigger-based alert, the system 200 may determine whether a condition causing an alert exists. For a daily, weekly, or other interval-based time-based alert, the system 200 may determine whether a next time interval for sending an alert has been reached. For a query alert, or for other alerts for which content is required, the system 200 may access primary sales data, secondary sales data, or other data required by the alert.

The system 200 provides alerts based on the evaluation and the data tracked by the secondary tracking system (1650). For example, alerts may be sent as an email message, a page, a fax, an SMS (Short Message Service) text message, an instant (e.g., chat) message, a message on a social networking service, or as another type of message.

Figure 18:
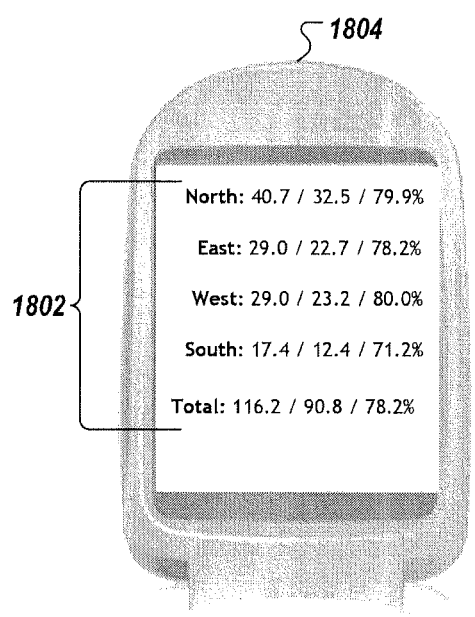

FIG. 18 illustrates the receipt of an SMS message 1802 on a mobile device 1804. The SMS message 1802 includes, for each of four regions, a target sales amount (e.g., where the target sales may be primary, secondary sales, or a combination of primary and secondary sales), an actual sales amount, and a percentage of actual versus target sales amounts. The SMS message 1802 also includes a total of target sales, actual sales, and an overall percentage of actual versus target sales, for all regions. The SMS message 1802 may be sent on a periodic basis (e.g., daily) or may be sent as a result of a trigger. For example, the SMS message may be sent if an actual versus target sales percentage (e.g., for a region, or for all regions) reaches a threshold (e.g., reaches an upper threshold of one hundred percent or reaches a lower threshold of sixty percent).

Figure 19:
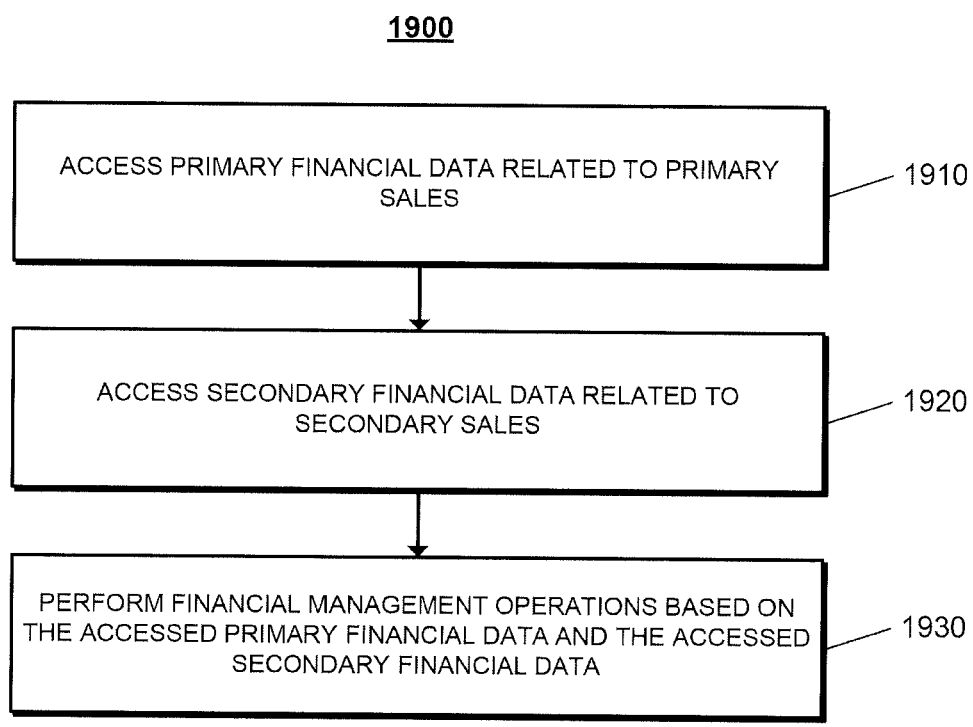

FIG. 19 illustrates a process 1900 for performing financial management operations. The operations of the process 1900 are described generally as being performed by the system 200. The operations of the process 1900 may be performed by one of the components of the system 200 (e.g., the secondary tracking system 210) or may be performed by a combination of the components of the system 200. In some implementations, operations of the process 1900 may be performed by one or more processors included in one or more electronic devices.

The system 200 accesses primary financial data related to primary sales (1910). For example, primary financial data related to primary sales may be accessed from a database, where the database may or may not be associated with an enterprise resource planning system. The primary financial data also may be received over a network by a secondary tracking system from a primary ERP system that tracked the primary financial data.

The system 200 accesses secondary financial data related to secondary sales (1920). For example, secondary financial data related to secondary sales may be accessed from a database, where the database may be associated with an enterprise resource planning system, a secondary tracking system, or may be another type of database. The secondary financial data may be accessed from electronic storage of a secondary tracking system that computed the secondary financial data based on secondary sales data derived using primary sales data and inventory levels at distributors.

The system 200 performs financial management operations based on the accessed primary financial data and the accessed secondary financial data (1930). For example, financial reports, such as invoicing, payments, claims totals, or other financial reports, may be generated. As another example, resource planning operations may be performed based on review of financial reports. Some financial management operations may be performed after a manual review of a financial report. Some financial management operations may be performed automatically, based on a trigger of one or more conditions evaluated using the accessed primary financial data and the accessed secondary financial data.

Figure 20:
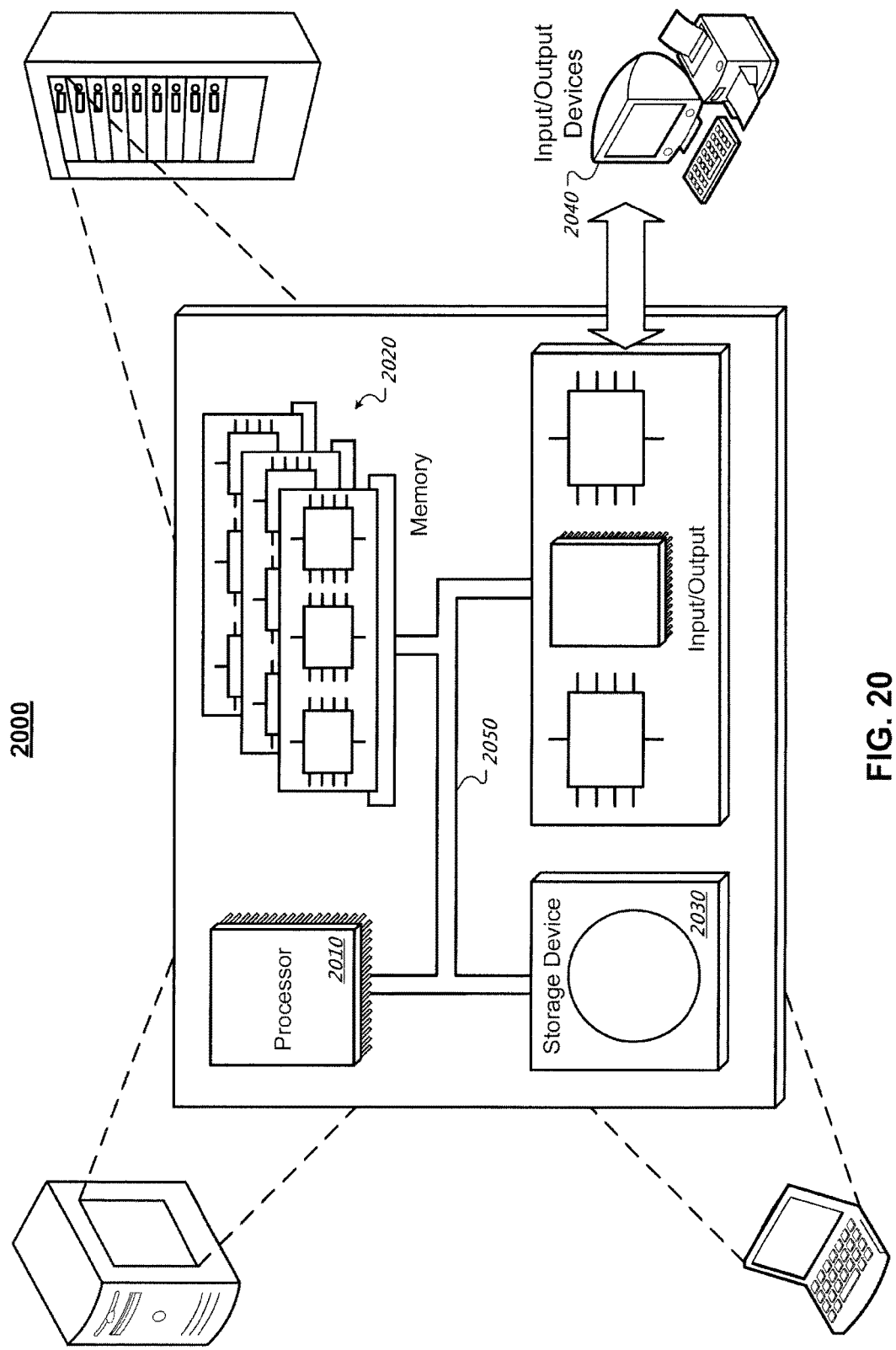

FIG. 20 is a schematic diagram of an example of a computer system 2000. The system 2000 can be used for the operations described in association with the processes 300, 600, 900, 1000, 1200, 1400, 1600, and 1900, according to one implementation. For example, the system 2000 may be included in the secondary tracking system 210 and/or the primary enterprise system 230.

The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or instructions stored on the storage device 2030 to display graphical information for a user interface on the input/output device 2040.

The memory 2020 stores information within the system 2000. In one implementation, the memory 2020 is a computer-readable medium. In one implementation, the memory 2020 is a volatile memory unit. In another implementation, the memory 2020 is a non-volatile memory unit.

The storage device 2030 is capable of providing mass storage for the system 2000. In one implementation, the storage device 2030 is a computer-readable medium. In various different implementations, the storage device 2030 may be a floppy disk device, a hard disk device, an optical disk device, or a tape device.

The input/output device 2040 provides input/output operations for the system 2000. In one implementation, the input/output device 2040 includes a keyboard and/or pointing device. In another implementation, the input/output device 2040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer system comprising:
at least one processor; and
at least one memory unit coupled to the at least one processor having stored thereon instructions which, when executed by the at least one processor, cause the at least one processor to perform operations comprising:

receiving, over a network by a secondary tracking system of a resource management system that includes (i) the secondary tracking system, (ii) an enterprise resource planning system, (iii) a distributor system, (iv) a display module, and (v) a database management system and from the enterprise resource planning system that is operated by a company and that is not configured to track secondary sales, primary sales data that is tracked by the enterprise resource planning system and that describes an amount of primary sales of products offered by the company to one or more recipients, where the secondary tracking system is configured to interface with the enterprise resource planning system over the network;

receiving, over the network by the secondary tracking system of the resource management system and from one or more recipient systems operated by the one or more recipients of the primary sales of the products offered by the company, inventory level data tracked by the one or more recipient systems that describes inventory levels for the products at the one or more recipients, the accessed inventory level data indicating an amount of inventory remaining at each of the one or more recipients, where the secondary tracking system is configured to interface with the one or more recipient systems over the network;

determining, by the secondary tracking system of the resource management system, goods in transit (GIT) between the company and the one or more recipients;

determining, by the secondary tracking system of the resource management system, stock transfers between the one or more recipients;

calculating, by the secondary tracking system of the resource management system and without using processing resources of the enterprise resource planning system or the distributor system, an amount of secondary sales of the products offered by the company made by a recipient of the primary sales of the products to another entity based on the amount of primary sales received by the secondary tracking system from the enterprise resource planning system operated by the company, the amount of inventory remaining at each of the one or more recipients received by the secondary tracking system from the one or more recipient systems operated by the one or more recipients, the goods in transit (GIT) between the company and the one or more recipients determined by the secondary tracking system, and the stock transfers between the one or more recipients determined by the secondary tracking system;

storing, by the database management system of the resource management system, the amount of secondary sales of the products offered by the company made by the recipient of the primary sales of the products to another entity in a database that is accessible for verifying recipient claims;

obtaining, by the database management system of the resource management system and from the distributor system of the resource management system, a recipient claim associated with (i) the recipient of the products and (ii) for an amount of secondary promotion that relates to secondary sales of the products offered by the company made by the recipient of the primary sales of the products to another entity by the recipient;

accessing, by the database management system of the resource management system, the primary sales of the products to the recipient and the stored amount of secondary sales of the products offered by the company made by the recipient of the primary sales of the products to another entity by the recipient;

obtaining, by the database management system of the resource management system, a rule for determining an amount of secondary promotion to provide a recipient for selling the products, wherein the rule specifies a ratio of an amount of secondary sales of the products by the recipient to another entity during a particular period of time compared to an amount of primary sales of the products from the company to the recipient for the particular period of time satisfies a predetermined threshold;

determining, by the secondary tracking system of the resource management system and without using the processing resources of the enterprise resource planning system or the distributor system, that the recipient claim satisfies the rule for determining an amount of secondary promotion to provide a recipient for selling the products based at least on the ratio of the primary sales of the products to the recipient compared to the stored amount of secondary sales of the products offered by the company made by the recipient of the primary sales of the products to another entity by the recipient satisfying the predetermined threshold;

in response to determining that the recipient claim satisfies the rule for determining an amount of secondary promotion to provide a recipient for selling the products based at least on the ratio of the primary sales of the products to the recipient compared to the stored amount of secondary sales of the products offered by the company made by the recipient of the primary sales of the products to another entity by the recipient satisfying the predetermined criteria, providing, by the display module of the resource management system, an indication in a graphical user interface that the recipient claim satisfies the rule for determining an amount of secondary promotion to provide the recipient for selling the products and a control for selection by a manager to approve the recipient claim associated with (i) the recipient of the product and (ii) for the amount of secondary promotion that relates to secondary sales of the products offered by the company made by the recipient of the primary sales of the products to another entity by the recipient; and receiving, by the display module of the resource management system and through the graphical user interface, approval data indicating that the manager has selected the control to approve the recipient claim associated with (i) the recipient of the product and (ii) for an amount of secondary promotion that relates to secondary sales of the products offered by the company made by the recipient of the primary sales of the products to another entity by the recipient.

2. The computer system of claim 1, wherein calculating the amount of secondary sales of the products offered by the company based on the amount of primary sales and the amount of inventory remaining at each of the one or more recipients comprises subtracting the amount of inventory remaining at each of the one or more recipients for a particular month from the amount of primary sales for the particular month and adding inventory level data for a month immediately before the particular month.

3. The computer system of claim 1, wherein the operations further comprise:
accessing performance management data including the stored secondary sales data; and
calculating performance management metrics based on the accessed performance management data.

4. The computer system of claim 3, wherein the operations further comprise:
accessing one or more rules that define procedures for handling incentives; and
generating incentives based on the calculated performance management metrics and the accessed one or more rules.

5. The computer system of claim 1, wherein the operations further comprise:
receiving user input indicating a desire to perform one or more operations related to master data management;
receiving user input defining master data information; and
performing master data management across an organization based on the master data information.

6. The computer system of claim 1, wherein the enterprise resource planning system is separate from the computer system and wherein the operations further comprise:
accessing, from electronic storage, the stored secondary sales data;
determining analytics based on the accessed primary sales data and the accessed secondary sales data; and
performing operations based on the determined analytics.

7. The computer system of claim 1, wherein the operations further comprise:
defining one or more frequency rules that indicate frequency with which an alert is provided;
defining one or more user rules that indicate one or more users to which the alert is provided;
defining one or more content rules that indicate content to include in the alert;
evaluating the frequency rules, the user rules, and the content rules based on data tracked by a secondary tracking system including the stored secondary sales data; and
providing an alert based on the evaluation and the data tracked by the secondary tracking system including the stored secondary sales data.

8. The system of claim 7, wherein evaluating the frequency rules, the user rules, and the content rules based on data tracked by a secondary tracking system including the stored secondary sales data, comprises:
determining that a next time interval for providing the alert has been reached based on the frequency indicated by the one or more frequency rules; and
in response to determining that the next time interval for providing the alert has been reached based on the frequency indicated by the one or more frequency rules:
identifying the one or more users to receive the alert based on the one or more user rules;
determining to include secondary sales data in the alert based on the one or more content rules;
generating the alert based on the secondary sales data; and
providing the generated alert to the one or more identified users.

9. The computer system of claim 1, wherein the operations further comprise:
determining a change to a definition associated with the amount of secondary sales;
generating a description of the change to the definition; and
providing the description to the enterprise resource planning system and the one or more recipient systems.

10. The system of claim 1, wherein the operations further comprise:
calculating another amount of secondary sales of the products offered by the company made by another recipient of the primary sales of the product to an entity based on the amount of primary sales and the amount of inventory remaining at each of the one or more recipients; and
determining a total amount of secondary sales for the company based on an aggregation of the calculated amounts of secondary sales.

11. The system of claim 1, wherein the calculated amount of secondary sales is for a particular time period, the primary sales data describes an amount of primary sales of products offered by the company during the particular time period, the inventory level data describes inventory levels for the products at the one or more recipients at a beginning of the particular time period and an end of the particular time period, the GIT describes the GIT at the end of the particular time period, and the stock transfers describe the stock transfers during the particular time period.

12. A computer-implemented method of using secondary sales data to perform operations related to enterprise resource planning, the method comprising:
receiving, over a network by a secondary tracking system of a resource management system that includes (i) the secondary tracking system, (ii) an enterprise resource planning system, (iii) a distributor system, (iv) a display module, and (v) a database management system and from the enterprise resource planning system that is operated by a company and that is not configured to track secondary sales, primary sales data that is tracked by the enterprise resource planning system and that describes an amount of primary sales of products offered by the company to one or more recipients, where the secondary tracking system is configured to interface with the enterprise resource planning system over the network;
receiving, over the network by the secondary tracking system of the resource management system and from one or more recipient systems operated by the one or more recipients of the primary sales of the products offered by the company, inventory level data tracked by the one or more recipient systems that describes inventory levels for the products at the one or more recipients, the accessed inventory level data indicating an amount of inventory remaining at each of the one or more recipients, where the secondary tracking system is configured to interface with the one or more recipient systems over the network;
determining, by the secondary tracking system of the resource management system, goods in transit (GIT) between the company and the one or more recipients;
determining, by the secondary tracking system of the resource management system, stock transfers between the one or more recipients;
calculating, by the secondary tracking system of the resource management system and without using processing resources of the enterprise resource planning system or the distributor system, an amount of secondary sales of the products offered by the company made by a recipient of the primary sales of the products to another entity based on the amount of primary sales received by the secondary tracking system from the enterprise resource planning system operated by the company, the amount of inventory remaining at each of the one or more recipients received by the secondary tracking system from the one or more recipient systems operated by the one or more recipients, the goods in transit (GIT) between the company and the one or more recipients determined by the secondary tracking system, and the stock transfers between the one or more recipients determined by the secondary tracking system;

storing, by the database management system of the resource management system, the amount of secondary sales of the products offered by the company made by the recipient of the primary sales of the products to another entity in a database that is accessible for verifying recipient claims;

obtaining, by the database management system of the resource management system and from the distributor system of the resource management system, a recipient claim associated with (i) the recipient of the products and (ii) for an amount of secondary promotion that relates to secondary sales of the products offered by the company made by the recipient of the primary sales of the products to another entity by the recipient;

accessing, by the database management system of the resource management system, the primary sales of the products to the recipient and the stored amount of secondary sales of the products offered by the company made by the recipient of the primary sales of the products to another entity by the recipient;

obtaining, by the database management system of the resource management system, a rule for determining an amount of secondary promotion to provide a recipient for selling the products, wherein the rule specifies a ratio of an amount of secondary sales of the products by the recipient to another entity during a particular period of time compared to an amount of primary sales of the products from the company to the recipient for the particular period of time satisfies a predetermined threshold;

determining, by the secondary tracking system of the resource management system and without using the processing resources of the enterprise resource planning system or the distributor system, that the recipient claim satisfies the rule for determining an amount of secondary promotion to provide a recipient for selling the products based at least on the ratio of the primary sales of the products to the recipient compared to the stored amount of secondary sales of the products offered by the company made by the recipient of the primary sales of the products to another entity by the recipient satisfying the predetermined threshold;

in response to determining that the recipient claim satisfies the rule for determining an amount of secondary promotion to provide a recipient for selling the products based at least on the ratio of the primary sales of the products to the recipient compared to the stored amount of secondary sales of the products offered by the company made by the recipient of the primary sales of the products to another entity by the recipient satisfying the predetermined criteria, providing, by the display module of the resource management system, an indication in a graphical user interface that the recipient claim satisfies the rule for determining an amount of secondary promotion to provide the recipient for selling the products and a control for selection by a manager to approve the recipient claim associated with (i) the recipient of the product and (ii) for the amount of secondary promotion that relates to secondary sales of the products offered by the company made by the recipient of the primary sales of the products to another entity by the recipient; and receiving, by the display module of the resource management system and through the graphical user interface, approval data indicating that the manager has selected the control to approve the recipient claim associated with (i) the recipient of the product and (ii) for an amount of secondary promotion that relates to secondary sales of the products offered by the company made by the recipient of the primary sales of the products to another entity by the recipient.

13. At least one computer-readable storage medium encoded with executable instructions that, when executed by at least one processor, cause the at least one processor to perform operations comprising:

receiving, over a network by a secondary tracking system of a resource management system that includes (i) the secondary tracking system, (ii) an enterprise resource planning system, (iii) a distributor system, (iv) a display module, and (v) a database management system and from the enterprise resource planning system that is operated by a company and that is not configured to track secondary sales, primary sales data that is tracked by the enterprise resource planning system and that describes an amount of primary sales of products offered by the company to one or more recipients, where the secondary tracking system is configured to interface with the enterprise resource planning system over the network;

receiving, over the network by the secondary tracking system of the resource management system and from one or more recipient systems operated by the one or more recipients of the primary sales of the products offered by the company, inventory level data tracked by the one or more recipient systems that describes inventory levels for the products at the one or more recipients, the accessed inventory level data indicating an amount of inventory remaining at each of the one or more recipients, where the secondary tracking system is configured to interface with the one or more recipient systems over the network;

determining, by the secondary tracking system of the resource management system, goods in transit (GIT) between the company and the one or more recipients;

determining, by the secondary tracking system of the resource management system, stock transfers between the one or more recipients;

calculating, by the secondary tracking system of the resource management system and without using processing resources of the enterprise resource planning system or the distributor system, an amount of secondary sales of the products offered by the company made by a recipient of the primary sales of the products to another entity based on the amount of primary sales received by the secondary tracking system from the enterprise resource planning system operated by the company, the amount of inventory remaining at each of the one or more recipients received by the secondary tracking system from the one or more recipient systems operated by the one or more recipients, the goods in transit (GIT) between the company and the one or more recipients determined by the secondary tracking system, and the stock transfers between the one or more recipients determined by the secondary tracking system;

storing, by the database management system of the resource management system, the amount of secondary sales of the products offered by the company made by the recipient of the primary sales of the products to another entity in a database that is accessible for verifying recipient claims;

obtaining, by the database management system of the resource management system and from the distributor system of the resource management system, a recipient claim associated with (i) the recipient of the products and (ii) for an amount of secondary promotion that relates to secondary sales of the products offered by the company made by the recipient of the primary sales of the products to another entity by the recipient;

accessing, by the database management system of the resource management system, the primary sales of the products to the recipient and the stored amount of secondary sales of the products offered by the company made by the recipient of the primary sales of the products to another entity by the recipient;

obtaining, by the database management system of the resource management system, a rule for determining an amount of secondary promotion to provide a recipient for selling the products, wherein the rule specifies a ratio of an amount of secondary sales of the products by the recipient to another entity during a particular period of time compared to an amount of primary sales of the products from the company to the recipient for the particular period of time satisfies a predetermined threshold;

determining, by the secondary tracking system of the resource management system and without using the processing resources of the enterprise resource planning system or the distributor system, that the recipient claim satisfies the rule for determining an amount of secondary promotion to provide a recipient for selling the products based at least on the ratio of the primary sales of the products to the recipient compared to the stored amount of secondary sales of the products offered by the company made by the recipient of the primary sales of the products to another entity by the recipient satisfying the predetermined threshold;

in response to determining that the recipient claim satisfies the rule for determining an amount of secondary promotion to provide a recipient for selling the products based at least on the ratio of the primary sales of the products to the recipient compared to the stored amount of secondary sales of the products offered by the company made by the recipient of the primary sales of the products to another entity by the recipient satisfying the predetermined criteria, providing, by the display module of the resource management system, an indication in a graphical user interface that the recipient claim satisfies the rule for determining an amount of secondary promotion to provide the recipient for selling the products and a control for selection by a manager to approve the recipient claim associated with (i) the recipient of the product and (ii) for the amount of secondary promotion that relates to secondary sales of the products offered by the company made by the recipient of the primary sales of the products to another entity by the recipient; and receiving, by the display module of the resource management system and through the graphical user interface, approval data indicating that the manager has selected the control to approve the recipient claim associated with (i) the recipient of the product and (ii) for an amount of secondary promotion that relates to secondary sales of the products offered by the company made by the recipient of the primary sales of the products to another entity by the recipient.

* * * * *